United States Patent [19]
Kondou et al.

[11] Patent Number: 6,073,075
[45] Date of Patent: *Jun. 6, 2000

[54] METHOD AND SYSTEM FOR PROVIDING INFORMATION FOR A MOBILE TERMINAL

[75] Inventors: Takeshi Kondou, Fujisawa; Yasuhiro Takahashi, Sagamihara; Susumu Matsui, Machida; Keishi Takebe, Yokohama, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/739,275

[22] Filed: Oct. 29, 1996

[30] Foreign Application Priority Data

Nov. 1, 1995 [JP] Japan .................. 7-284818

[51] Int. Cl.[7] .................................. G06F 165/00
[52] U.S. Cl. .................... 701/203; 701/208; 701/211; 340/988
[58] Field of Search ................... 701/200, 202, 701/201, 207, 208, 209, 210, 211, 213; 340/990, 995, 988

[56] References Cited

U.S. PATENT DOCUMENTS

| | | |
|---|---|---|
| 4,847,773 | 7/1989 | Van Helsdingen et al. ............ 364/443 |
| 4,876,651 | 10/1989 | Dawson et al. ......................... 364/449 |
| 5,087,916 | 2/1992 | Metzdorff et al. ...................... 342/64 |
| 5,152,012 | 9/1992 | Schwob ............................... 455/158.5 |
| 5,153,836 | 10/1992 | Fraughton et al. ..................... 364/461 |
| 5,157,614 | 10/1992 | Kashiwazaki et al. ................. 364/443 |
| 5,172,321 | 12/1992 | Ghaem et al. .......................... 364/444 |
| 5,448,485 | 9/1995 | Ishibashi et al. ....................... 364/443 |
| 5,457,800 | 10/1995 | Howells et al. ........................ 395/728 |
| 5,610,821 | 3/1997 | Gazis et al. ........................... 364/444.2 |
| 5,648,769 | 7/1997 | Sato et al. .............................. 340/988 |
| 5,715,163 | 2/1998 | Bang et al. ........................... 364/444.2 |
| 5,719,771 | 2/1998 | Buck et al. ............................. 364/443 |
| 5,758,297 | 5/1998 | Gaultier .................................. 701/14 |
| 5,787,170 | 7/1998 | Op De Beek ............................. 380/4 |
| 5,806,018 | 9/1998 | Smith et al. ............................ 701/211 |

*Primary Examiner*—William A. Cuchlinski, Jr.
*Assistant Examiner*—Arthur D. Donnelly
*Attorney, Agent, or Firm*—Antonelli, Terry, Stout & Kraus, LLP

[57] ABSTRACT

A mobile terminal, and an information providing method and system which immediately provides information, which the user of the mobile terminal desires, for the mobile terminal. Areas and related service information are stored in corresponding relationship in a database. An information server which includes means for calculating the area of a destination of the mobile terminal loads information on the destination area from the database to the mobile terminal which moves toward the destination area, using radio communication means before the mobile terminal arrives at the destination area.

16 Claims, 19 Drawing Sheets

FIG.4

| | | | | |
|---|---|---|---|---|
| DATA 1 | ADDRESS | RETRIEVAL KEY | SERVICE CLASSIFICATION | SERVICE INFORMATION |
| DATA 2 | ADDRESS | RETRIEVAL KEY | SERVICE CLASSIFICATION | SERVICE INFORMATION |
| DATA 3 | ADDRESS | RETRIEVAL KEY | SERVICE CLASSIFICATION | SERVICE INFORMATION |
| DATA 4 | ADDRESS | RETRIEVAL KEY | SERVICE CLASSIFICATION | SERVICE INFORMATION |
| DATA 5 | ADDRESS | RETRIEVAL KEY | SERVICE CLASSIFICATION | SERVICE INFORMATION |
| ⋮ | ⋮ | ⋮ | ⋮ | ⋮ |
| DATA N | ADDRESS | RETRIEVAL KEY | DERVICE CLASSIFICATION | SERVICE INFORMATION |

FIG.5

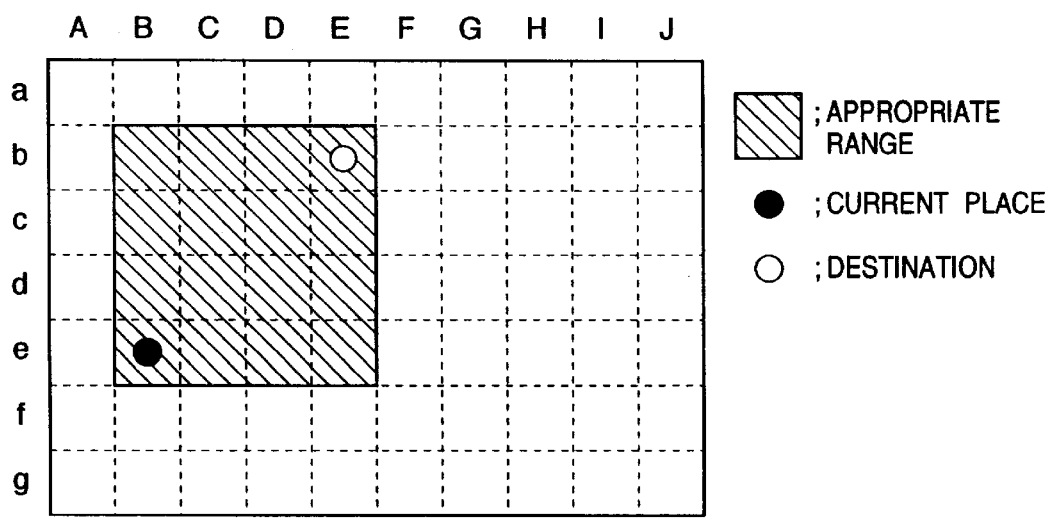

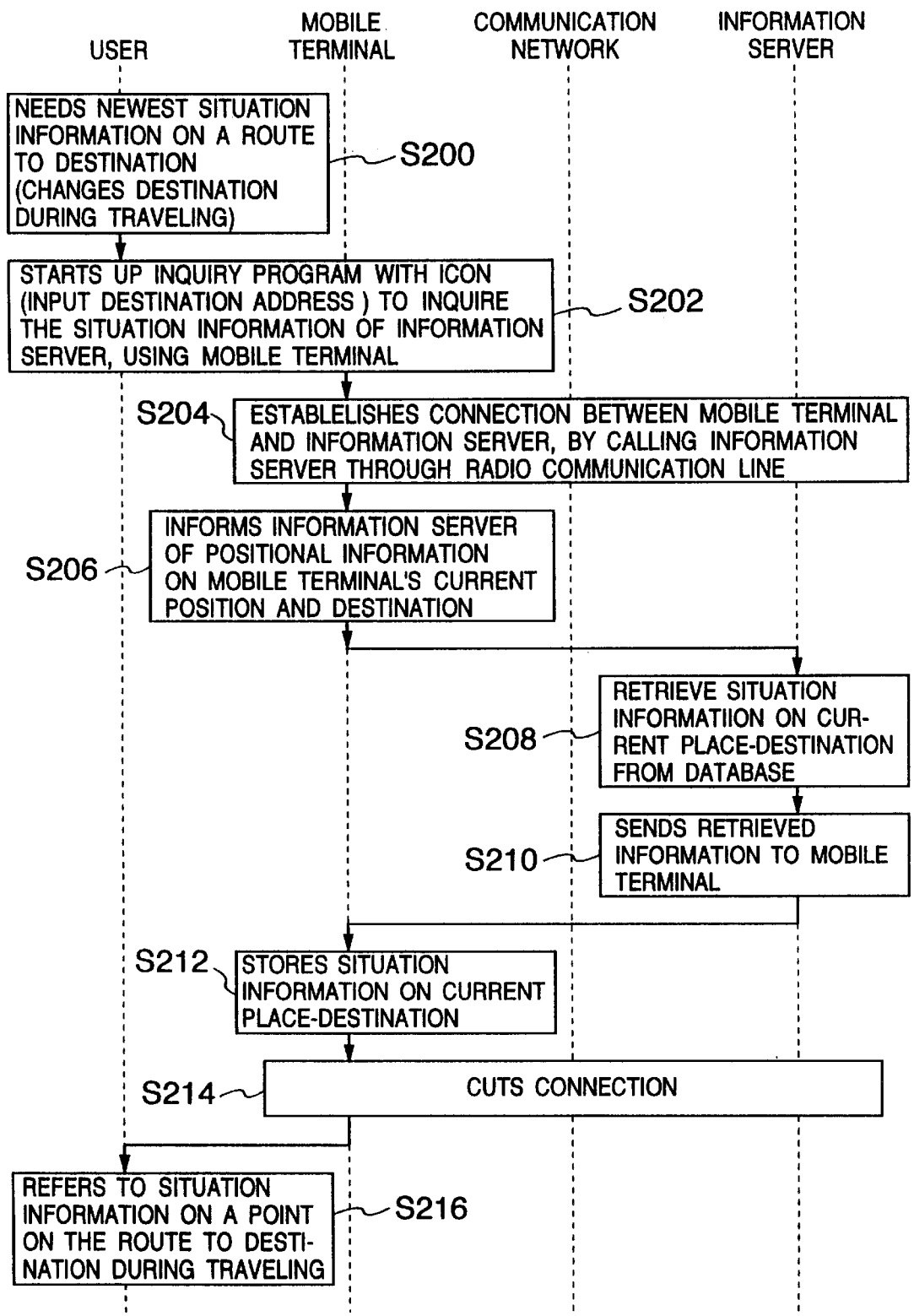

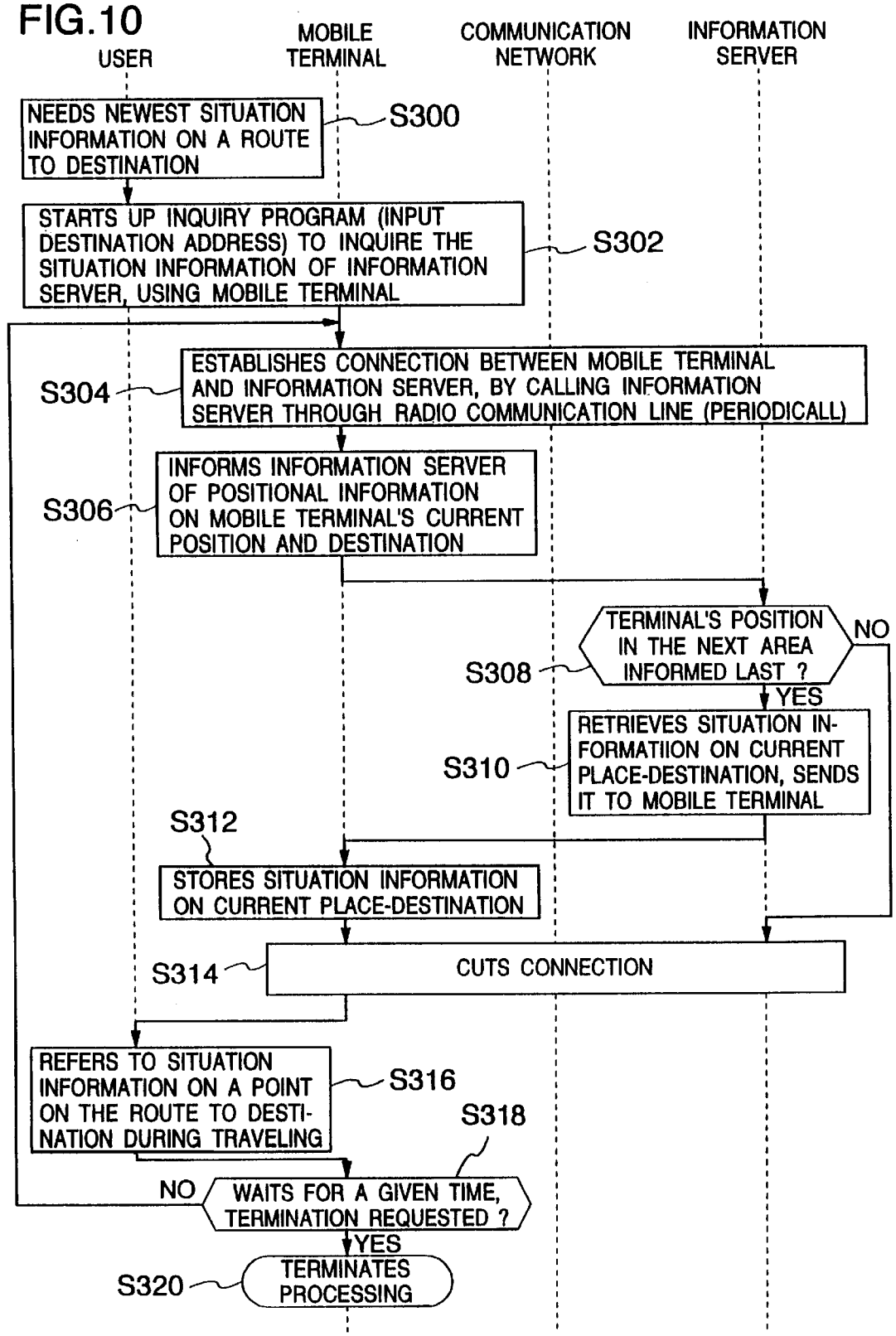

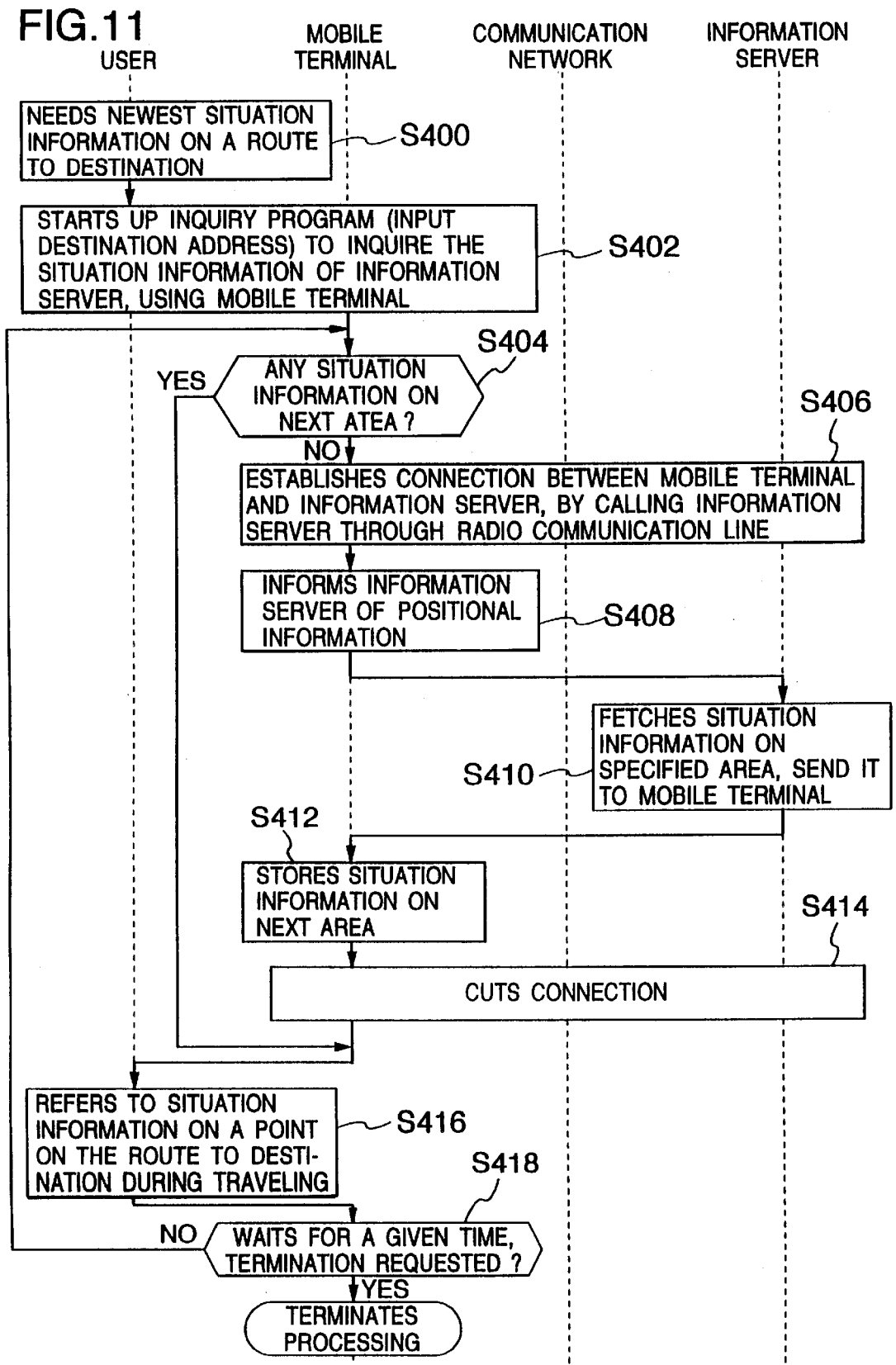

L: DISTANCE THROUGH WHICH MOBILE TERMINAL MOVES IN A TIME T
T: TIME TAKEN TO LOAD SITUATION INFORMATION ON ONE AREA ON MOBILE TERMINAL

▨ : X AREA WHOSE SITUATION INFORMATION IS LOADED AT THE ORIGIN

FIG.16
| AREA INFORMATION | AREA a |
|---|---|
| SERVICE CLASSIFICATION | SERVICE INFORMATION |
| IMAGE | DECOMPRESSED DATA 1 |
| VOICE | DECOMPRESSED DATA 2 |
| TEXT | DECOMPRESSED DATA 3 |
FIG.17A
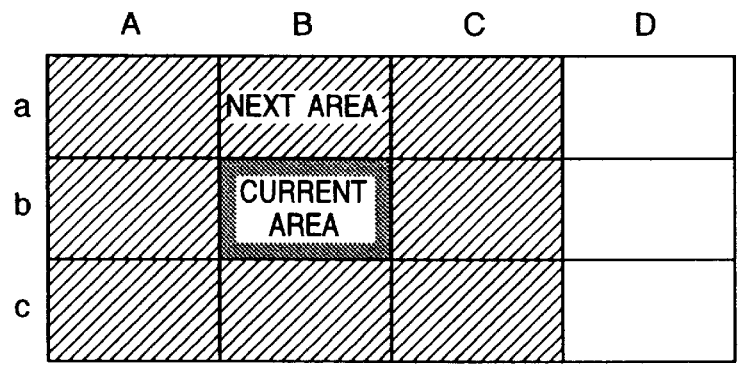
FIG.17B
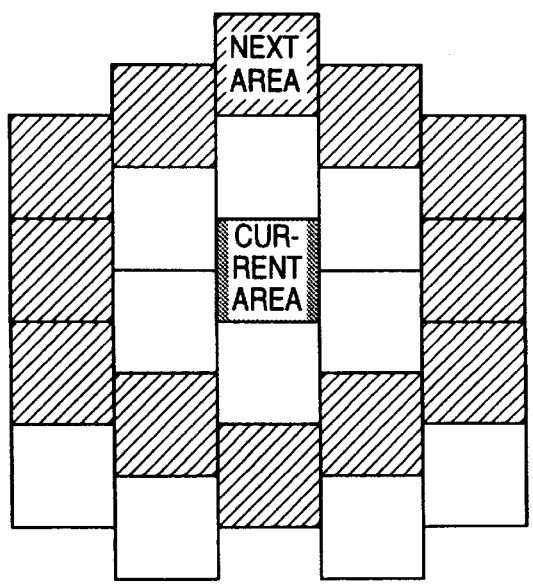

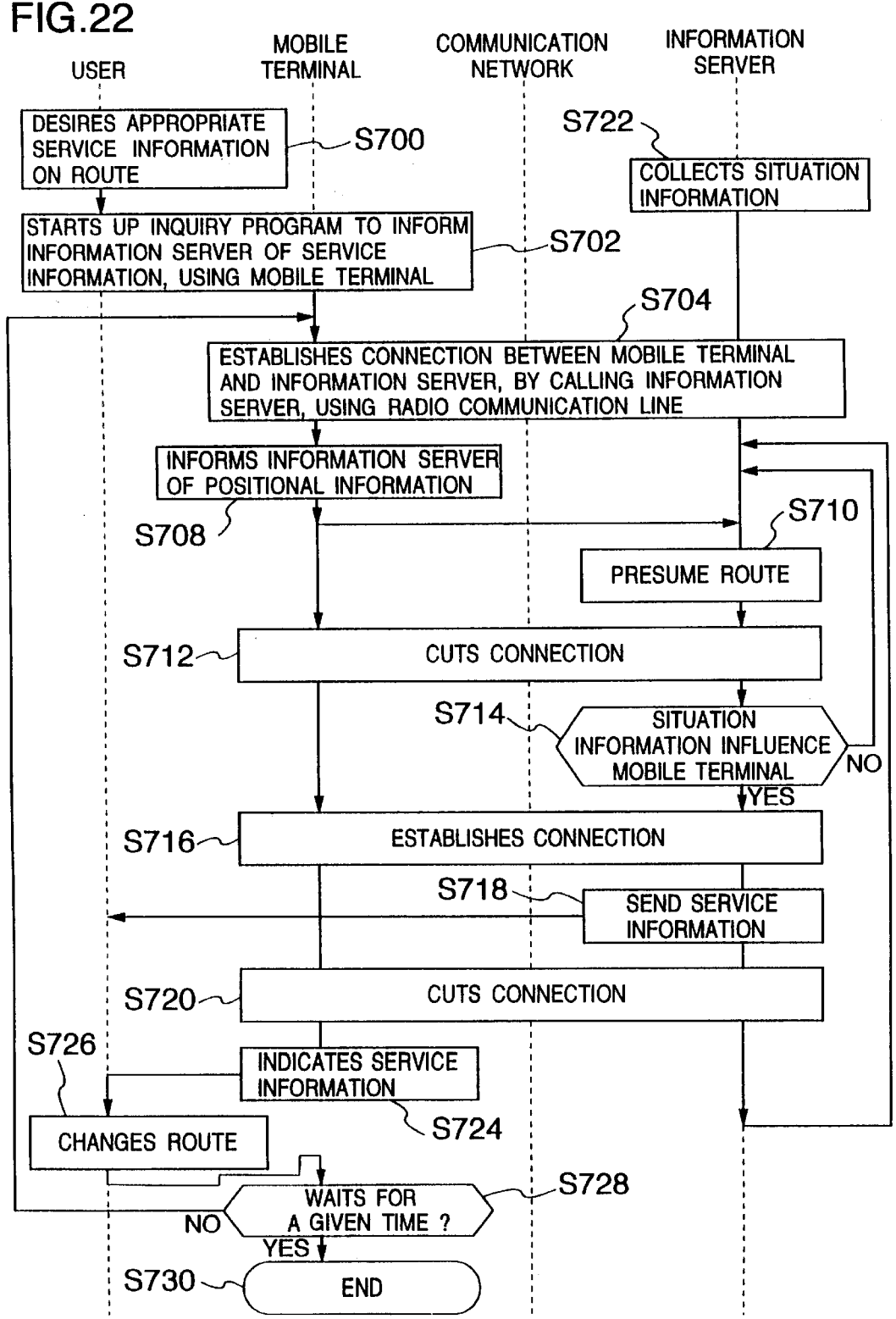

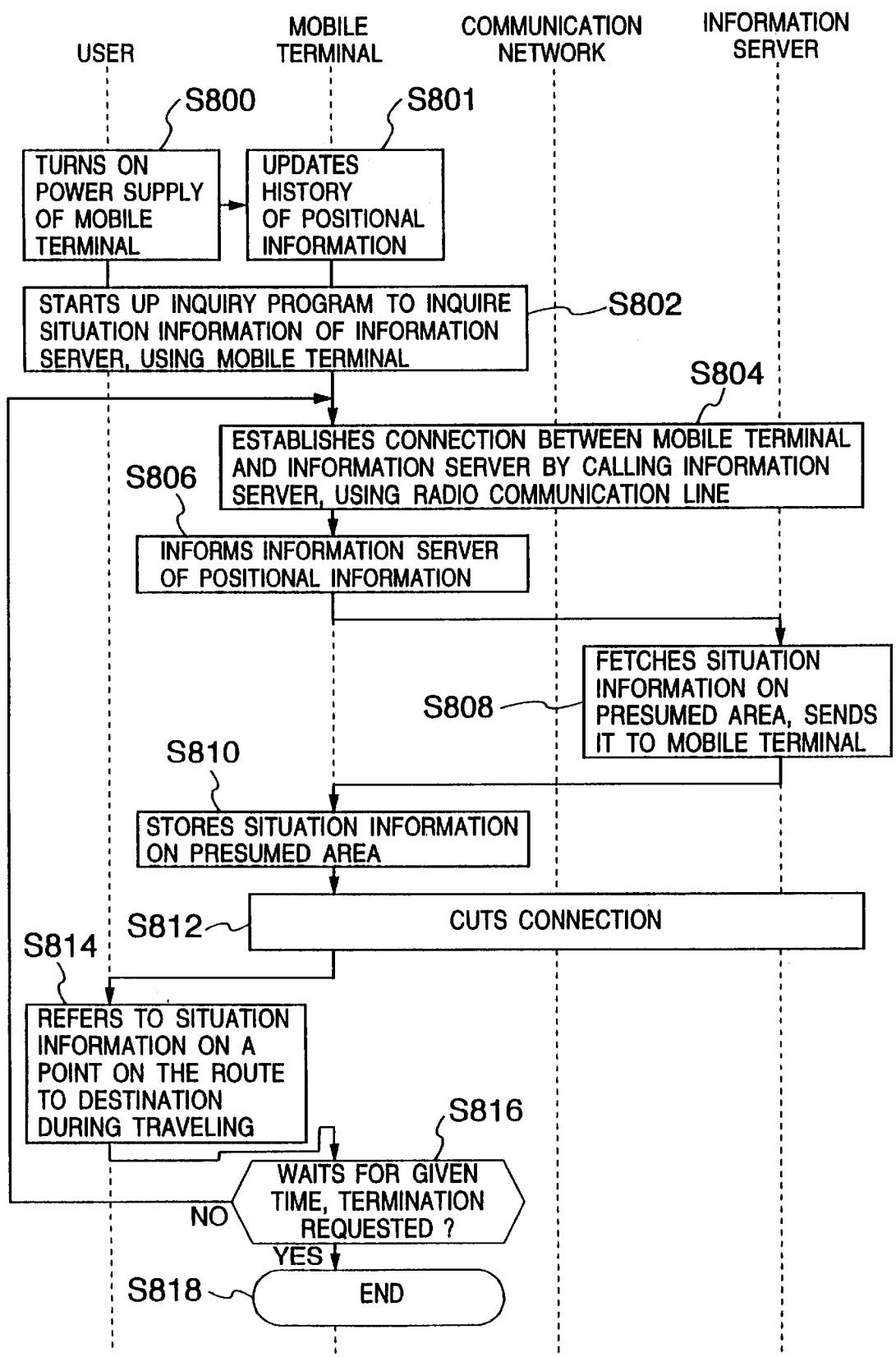

METHOD AND SYSTEM FOR PROVIDING INFORMATION FOR A MOBILE TERMINAL

BACKGROUND OF THE INVENTION

The present invention relates to a small lightweight portable computer called a mobile terminal, and an information providing method and system in which an information server provides the mobile terminal with appropriate service information which the mobile terminal desires and which is related or strongly correlated to an area where the mobile terminal is present, depending on the position of the mobile terminal.

The invention which provides the user of a mobile terminal with very convenient meticulous services by using information on the position of the terminal is disclosed in JP-A-5-102906, entitled "Mobile Communication System". In this invention, the user who is able to know his position, using a car navigation system, sends information on the user's position through a car telephone to a service center and downloads the newest information on a possible traffic jam and/or a map concerning his position from the service center. Another invention discloses that without receiving information on the user's position expressly from the user, an area in which the user is present is presumed on the basis of a position of a base station for car telephones, and service information on a possible traffic jam, etc., in that area is downloaded.

In the above conventional techniques, when the newest map data is to be obtained to know the newest route situation on route interruption due to road works and/or opening of a new route, the data transmission rate through the car telephone is low, for example 2.4 kbps whereas compressed map data still reaches several tens of kilobytes or more. Thus, the car travels about several kilometers during only the time taken for sending the retrieved map data and necessary information can not be obtained on a real time basis. Actually, radio transmission by the car telephone provides low quality data and a bit error is likely to occur. For ensuring purposes, re-transmission of data is required and hence it is difficult to receive necessary information on a real time basis.

In the above conventional inventions, for example, information on the occurrence of a traffic jam over a specified length of a specified road in a specified area in the vicinity of user's position is given to user in response to the user's inquiry. Thus, unless the user has a knowledge about a route in which a traffic jam is likely to occur, the user does not know the timing in which the user inquires about such information, would be involved in the traffic jam, and wishes to obtain information as to how many hours it would take from the occurrence of the traffic jam to its disappearance. However, the user should rather know which route the user should select to reach his destination in a minimum time when a traffic jam occurs on his selected route than he knows how much time it would take from the implication of the user into the traffic jam to the clearance of the jam.

SUMMARY OF THE INVENTION

It is therefore an object of the present invention to provide a communication method capable of providing the user with proper information on a real time basis and a mobile terminal preferred for carrying out this communication method.

Another object of the present invention is to provide a communication method which transfers proper information to the user at appropriate timing and a mobile terminal preferred for carrying out this communication method.

In order to achieve the above objects, the present invention loads service information beforehand on a mobile terminal. Specifically, the present invention provides a method of providing information from an information server to a mobile terminal in a system which includes the mobile terminal, the information server being connected to a database, a network connected to the information server, and a terminal connected to the network for providing various information for the information server, including the steps of connecting the mobile terminal to the network and when information on the current place and destination of the mobile terminal is input, and reporting the input information on the current place and destination to the information server through the network; causing the information server to determine the whole area containing the current place and destination of the mobile terminal when the information server receives from the mobile terminal a report of information on the current place and destination of the mobile terminal, and to send service information containing positional information corresponding to the whole area through the network to the mobile terminal; and causing the mobile terminal to store in storage the received service information containing positional information corresponding to the whole area, to cut the connection to the network and to output the beforehand stored service information in accordance with the user's request.

The present invention also provides a method of providing information from an information server to a mobile terminal in a system which includes the mobile terminal, the information server connected to a database, a network connected to the information server, and a terminal connected to the network for providing various information for the information server, wherein the mobile terminal is connected to a portable telephone set so as to be connected to the network, and connected to a GPS which stores information on its position periodically in a memory, and when the mobile terminal receives information on the present place of the GPS from the GPS and input information on a destination of the mobile terminal, the mobile terminal informs through the network the information server of the information on the current place and the destination of the mobile terminal; when the information server receives from the mobile terminal information on the current place and destination, the information server determines the whole area containing the current place and destination, and sends service information containing positional information corresponding to the whole area through the network to the mobile terminal; and the mobile terminal stores in storage the received service information containing the positional information corresponding to the whole area, cutting the connection to the network, and outputs the beforehand stored service information in accordance with the user's request.

According to the present invention, in the above method, the mobile terminal sends information on its current place periodically through the network to the information server, and the information server sends the service information periodically through the network to the mobile terminal.

According to the present invention, in the above method, when the information server receives the information on the current place of the mobile terminal from the mobile terminal, the information server compares the service information on the area sent previously to the mobile terminal and service information on an area to be sent this time, and when the service information on the area to be sent this time is different from that sent previously, the information server sends the service information on the area to be sent this time through the network to the mobile terminal.

According to the present invention, in the above method, the mobile terminal produces history information by storing information on the position of the mobile terminal periodically, determines the next area from the produced history information, reports information on the next area to the information server through the network and inquires of the information server service information on the next area.

According to the present invention, in the above method, the service information on the whole area containing the current place and destination of the mobile terminal sent from the information server is stored as compressed data in external storage of the mobile terminal, the service information on the next area stored in the external storage is read when the determined service information on the next area is not stored in a RAM of the mobile terminal, the read service information is decompressed, and the decompressed information is stored in the RAM of the mobile terminal.

BRIEF DESCRIPTION OF THE DRAWINGS

FIG. 4 illustrates a data format of service information stored in a database;

FIG. 5 illustrates the relationship between the position of a mobile terminal and its areas;

FIG. 9 illustrates a sequence of operations performed between a mobile terminal and an information server;

FIG. 10 illustrates a sequence of operations performed between a mobile terminal and an information server;

FIG. 11 illustrates a sequence of operations performed between a mobile terminal and an information server;

FIG. 16 shows a format of service information spread in primary storage of a mobile terminal;

FIGS. 17A, 17B each illustrate the relationship between the present and next areas and a method of constructing an area;

FIG. 22 illustrates a logic for changing an information quantity to be loaded depending on the speed of a mobile terminal; and FIG. 23 illustrates application of the present invention to a remote business support system.

DESCRIPTION OF THE PREFERRED EMBODIMENTS

Figure 2:
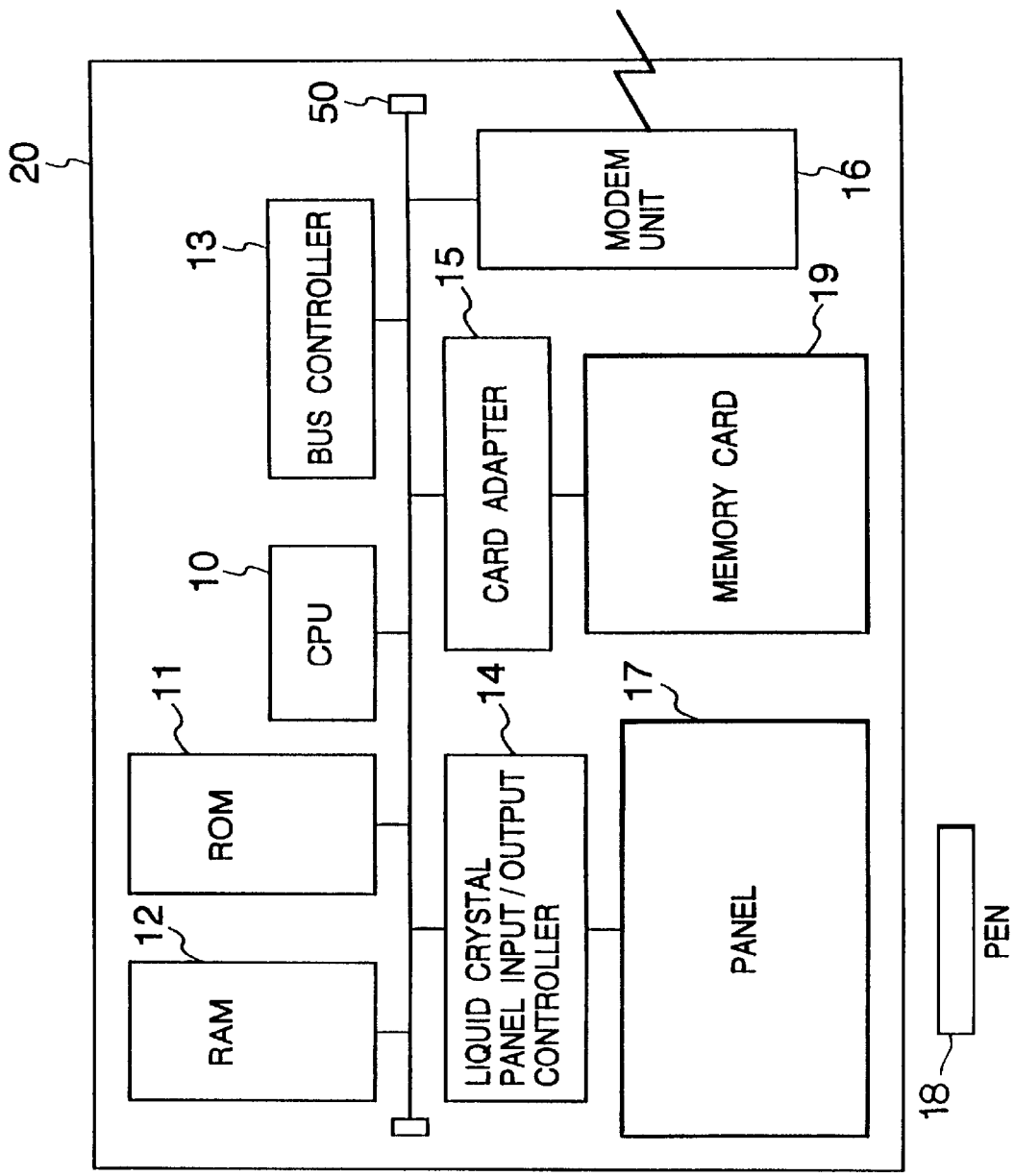
FIG. 2 illustrates the structure of hardware of a mobile terminal in a navigation system.

FIG. 2 illustrates the structure of hardware of a mobile terminal in the present system. The mobile terminal 20 includes a CPU (Central Processing Unit) 10, which communicates with a RAM (Random Access Memory) 12 and a ROM (Read Only Memory) 11 as the main storage and also with a liquid crystal panel input/output controller 14, a card adapter 15 and a modem unit 16 as peripheral input/output units through a system bus 50. A bus controller 13 controls the communication between CPU 10 and related peripheral input/output devices. The liquid crystal panel input/output controller 14 is connected to a panel 17 which is a display and an input unit for a pen 18. The card adapter 15 is connected to a removable memory card 19 as an external storage. The modem unit 16 is connectable to a telephone line by which the mobile terminal 20 communicates with a remote computer system.

Figure 3:
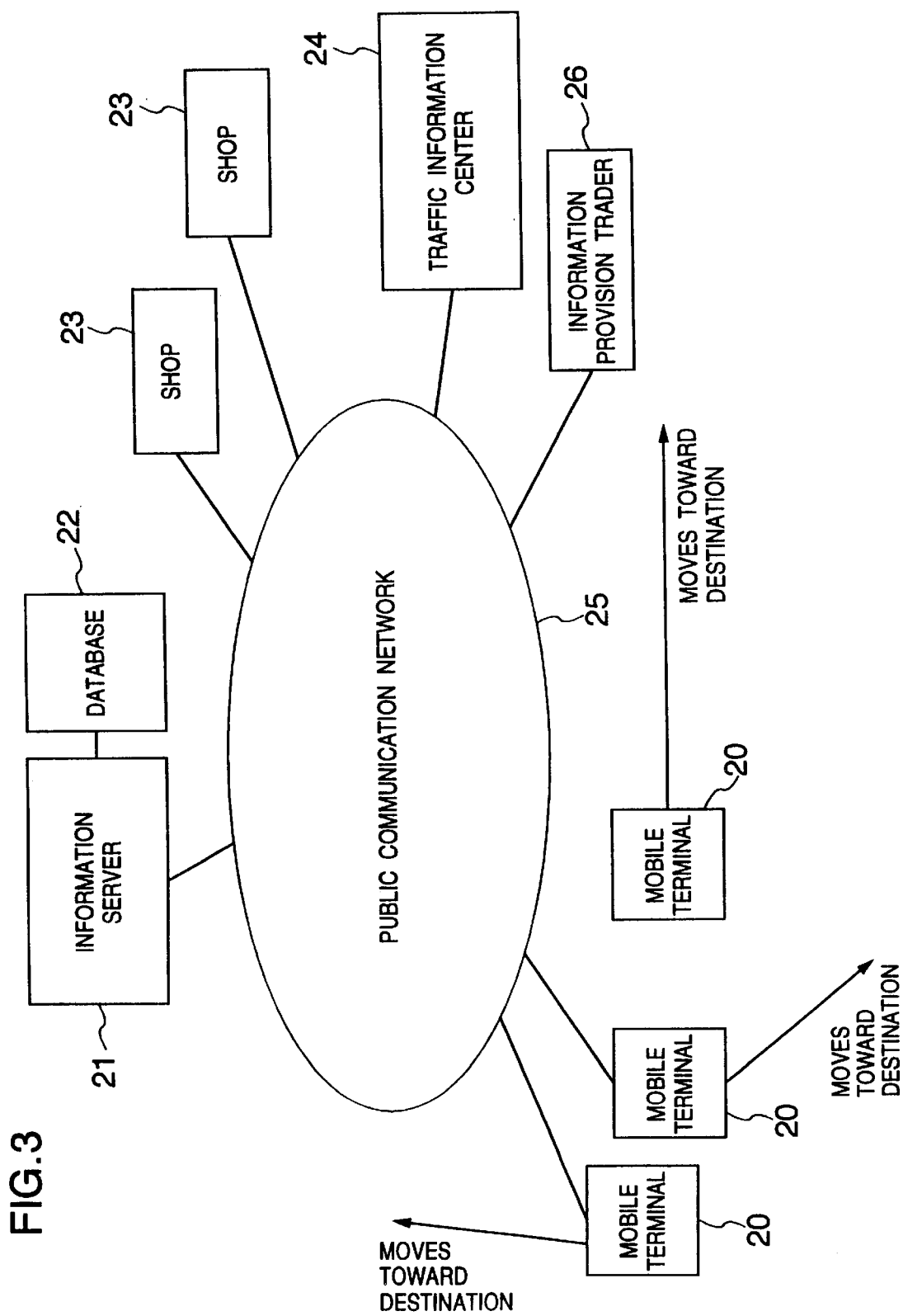
FIG. 3 illustrates the composition of the navigation system.

FIG. 3 is a block diagram of the present system. Reference numeral 21 denotes an information server which is connected to a data base 22. The information server 21 is computer which is the same in basic structure as the mobile terminal 20 excluding in storage capacity and an input/output controller thereof for a database 22. Reference numeral 23 denotes a service information provider for the information server 21 and includes various shops such as restaurants and/or convenience stores. Reference numeral 24 denotes a traffic information center which has gripped the current situation of roads/routes. The mobile terminal 20 is connected through a public network 25 to the respective devices mentioned above. The information server 21 receives traffic jam information from the traffic information center 24 and service information such as map information and/or article information for the user from the shops 23 and stores them in the database 22.

FIG. 4 illustrates a data format used in the database 22. The service information in the present invention is service information using an image, for example, of a road map, voice service information uttered when a map guidance is read, and text service information such as a message display for a shop guide. In any rate, as long as a method is used which stores encoded data in the database 22 in spite the type of the service information, service information of any type of service may be stored. Information which identifies the classification of the above-mentioned service information is described in the service classification of FIG. 4. Retrieval key information provided to facilitate the search of an area with positional information is described in a retrieval key section. Information indicative of the storage position and range of data in the database 22 is described in an address section.

Referring to FIG. 5, the relationship between service information and retrieval keys for the respective data in the database 22 will be supplemented. A region of interest is divided into areas which are then named, in correspondence to positions on a map. For example, the present place where a mobile terminal is present is named an "e-B area". A mapping table which specifies an appropriate area from information on the position of the mobile terminal is provided so that positional information and areas are placed in corresponding relationship. The name of this area is stored in the retrieval key section.

Figure 1:
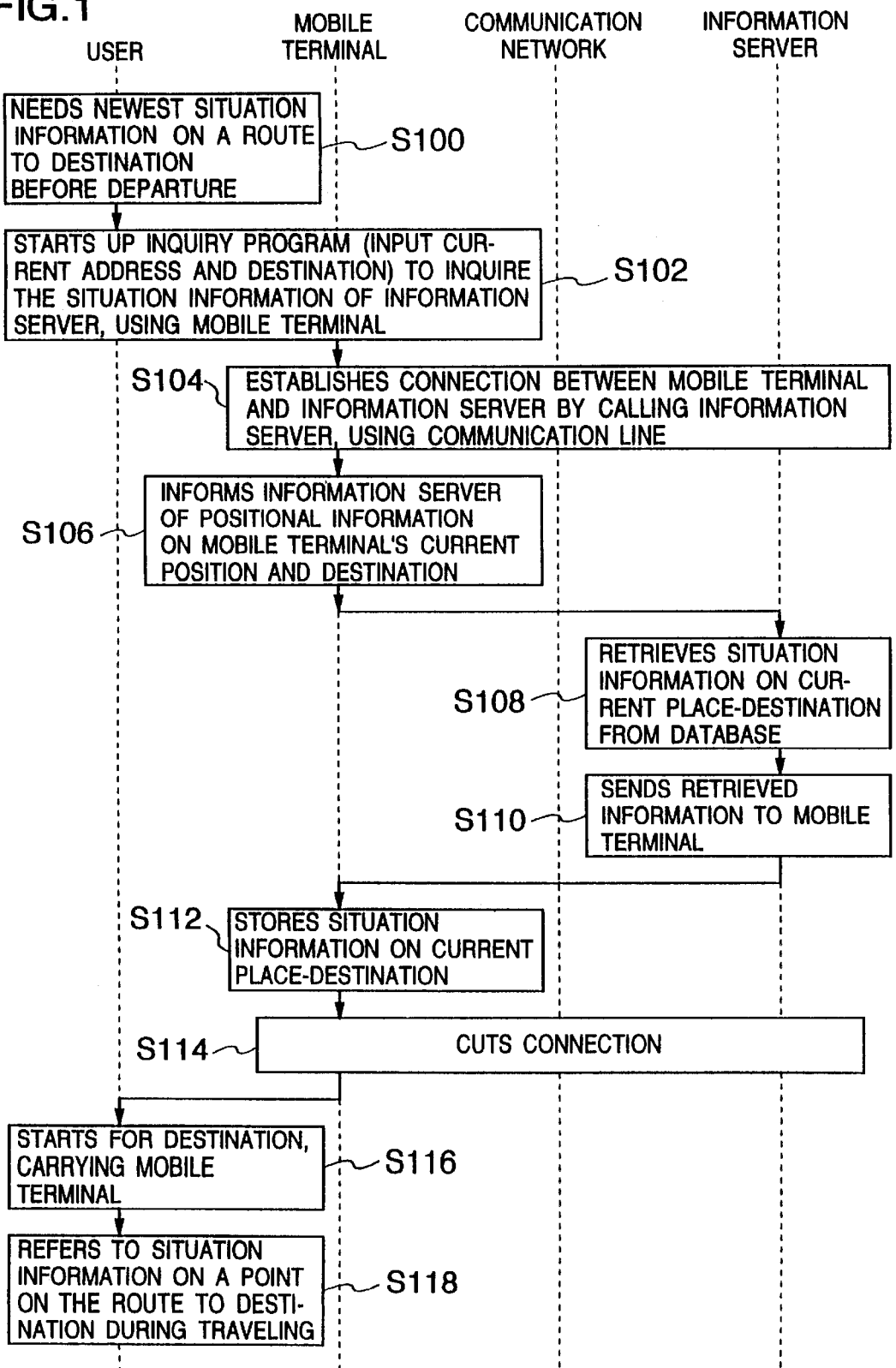
FIG. 1 illustrates a sequence of operations performed between a mobile terminal and an information server.

FIG. 1 shows a sequence of operations in which the mobile terminal 10 receives information service involved in the present invention.

Assume that the user goes out for driving. First, the user desires to know the newest information about a road through which the user arrives at his destination when he selects that road before he starts out (S100). He connects the mobile terminal 10 to the telephone line and starts up a program which inquires the situation of the road, using the mobile terminal 10. In this case, he inputs data on his current address and the destination address in accordance with the instruction of the program (S102). The started-up inquiry program calls the information server 21 over the telephone line and establishes a connection which is a communication channel for logical data communication between the mobile terminal 10 and the information server 21 (S104). The mobile terminal 10 then informs the information server 21 of the positional information on the user's current place and destination input by the user (S106). As shown in FIG. 5, the information server 21 which has received the positional information determines the areas of the user's current place and destination and then determines the range of areas to be retrieved. In the present embodiment, assuming now that the current place and destination are areas e-B and b-E, respectively, the range of areas to be retrieved are areas e-B, e-C, e-D, e-E, d-B, d-C, . . . and takes the form of a rectangle in which the current place and destination are present as the diagonal areas. These areas are used as retrieval keys to retrieve data including the appropriate service information from the data base (S108). The information server 21 then sends the retrieved service information to the mobile terminal (S110).

Figure 6:
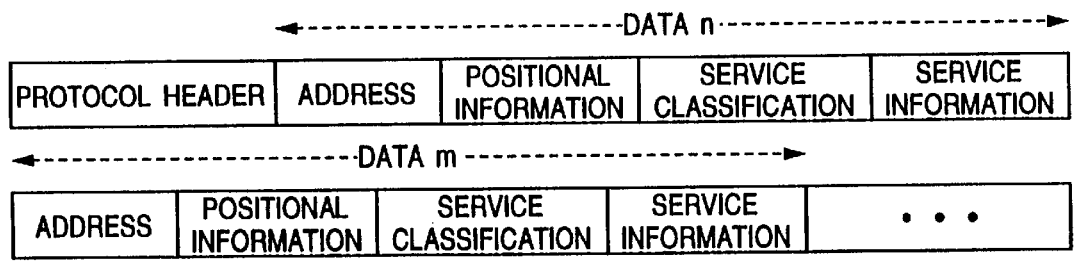
FIG. 6 shows a data format of service information when sent.

FIG. 6 shows a format of data sent from the information server to the mobile terminal. In this format, the information which controls a communication protocol is at the head of the format and accompanied by data retrieved from the database. In this case, information on the position (range) of an area to which the appropriate service information is related is sent in place of the retrieval keys. Receiving this information, the mobile terminal converts this information to a retrievable form in accordance with the positional information of the service information and stores that converted information in the memory card (S112). After the service information has been transferred, the connection is cut off (S114). Informed that downloading of the service information has been completed by the inquiry program and that the connection has been cut, the user cuts the mobile terminal from the line and starts for the destination while carrying the mobile terminal (S116).

When the user desires to know the situation of a point on the road to the destination during travelling, the user refers to necessary information, for example, on traffic jams by retrieving the service information downloaded beforehand (S118).

Figure 7:
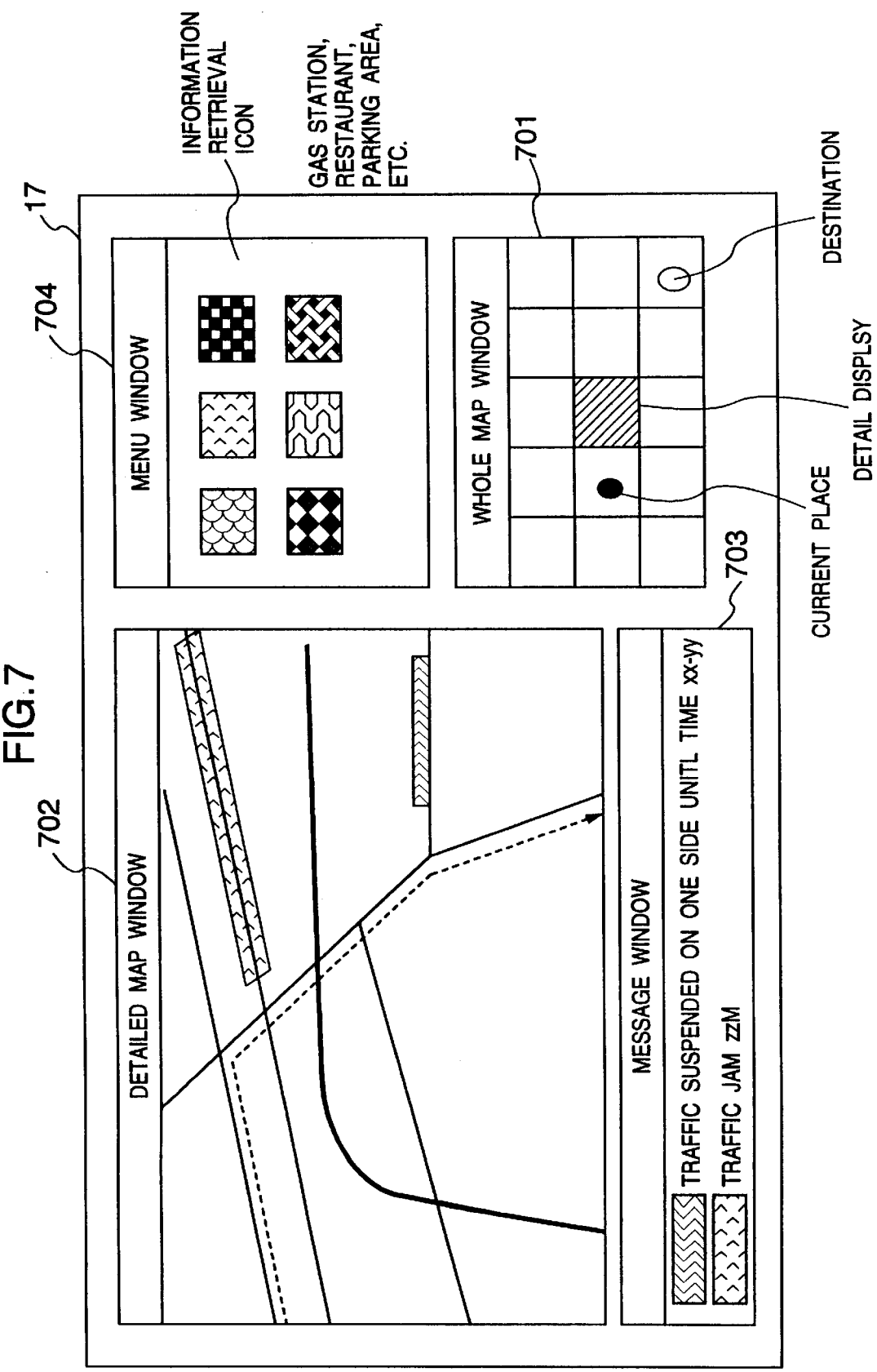
FIG. 7 illustrates the structure of a display screen for navigation information in the mobile terminal.

FIG. 7 illustrates a service information reference screen of the mobile terminal 20. The present screen is composed of various windows which will be described next. First, a whole map window 701 will be described. This displays in a rough map all the areas related to the downloaded service information. The map is divided into blocks having a predetermined side length in which the present place (in this example, the starting point) and the destination are indicated. In addition, a block indicated by a detailed map window 702 to be described later is recognizable. The window 702 displays the detailed map of a block selected in the whole map window 701. Road information on the course to the destination and traffic jams are superimposed and displayed graphically on the map. A message window 703 displays textized service information. A menu window 704 displays control icons and retrieval information icons for a service information retrieval program as a program of the present mobile terminal 20. The control icons expresses by images the commands for executing the start-up and termination of the present program by selecting the appropriate ones of those icons.

The retrieval information icons are, for example, gas stations, restaurants, parking places, resting places and drive-ins. By selecting any one of these icons, its related information on its position, price and features) is displayed as image data on the detailed map window 702. Text data is displayed on the message window 703. When the related information involves voice data, a voice output unit may be connected to the mobile terminal 20 such that the voice data on the related information may be communicated as an announcement to the user by selecting the appropriate icon.

In this embodiment, service information is loaded on the mobile terminal 20 at the starting point before the user starts for his destination. Thus, this system is suitable for use when the destination is predetermined or relatively near to the starting point and not changed. When the destination is far away from the starting point and it takes much time for the user to reach the destination, service information such as traffic jams loaded beforehand may get old and not express the real situation of the place where the mobile terminal is present. When the initial destination is changed for some reasons, beforehand loaded service information such as traffic jams to the destination may be useless. In order to avoid such situation, the user may stop at a nearby public telephone with data communication terminals at constant intervals of time or distance or when the user changes his destination to access the information server 21 to download the newest service information or service information to the changed destination. Of course, it is necessary that the positions of the public telephones should be contained in the service information and that the user is able to refer to such service information.

An embodiment, in which the access position is not limited to a fixed one, using radio communication means will be described next.

Figure 8:
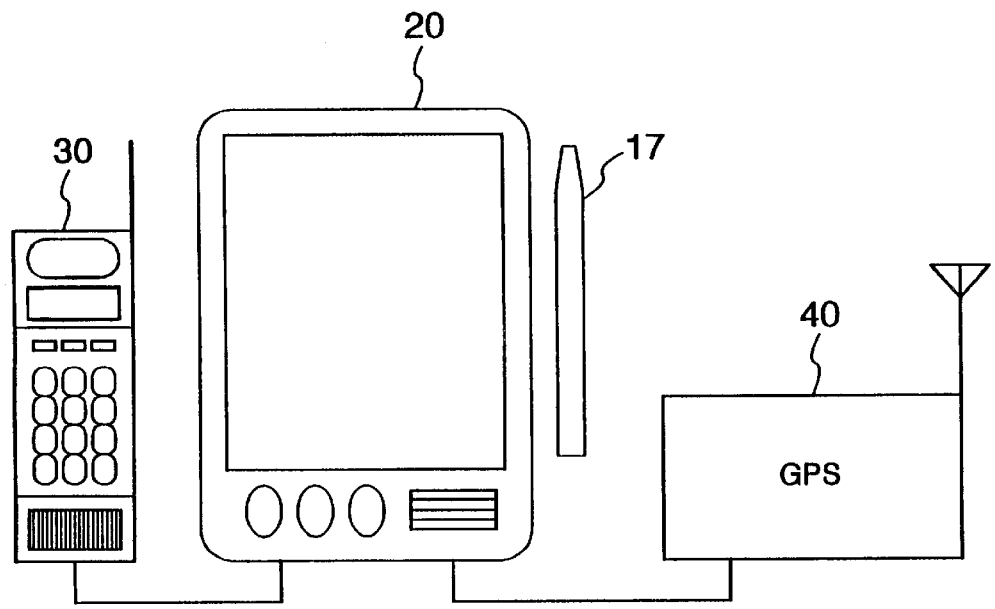
FIG. 8 illustrates the composition of a mobile terminal system.

FIG. 8 illustrates a system structure. Reference numeral 30 denotes a car telephone which is connected to the mobile terminal 20 to act as an intermediary for data communication between the information server 21 and the mobile terminal 20. Reference numeral 40 denotes a GPS (Global Positioning System) which is connected to the mobile terminal 20 and has the function of calculating its position with high accuracy (with an error of several meters) by receiving radio signals from a plurality of satellites. GPS 40 calculates its position periodically, stores the obtained data in its memory (not shown) and delivers the stored data on its position to the mobile terminal 20 in response to a request from the mobile terminal 20. At this time, GPS 40 informs the mobile terminal 20 of information on the position of GPS 40 in longitude and latitude.

FIG. 9 shows a download sequencing operation about service information performed when the destination is changed on the way to the destination. The difference in sequencing operation between FIGS. 1 and 9 will be mainly described. The user needs the newest information on the situation of its changed destination (S200). Confirming that the mobile terminal 20 has been connected to the car telephone 30, the user starts up the load situation inquiry program. In this case, the user is only required to input data on an object address in accordance with the instruction of the program unlike step S102 (S202). Step S204 which establishes the connection is similar to S104, but differs from S104 in that the former uses a radio communication line. Steps S208–S214 are exactly the same as S108–S114. Since the mobile terminal 20 transfers data on the longitude and latitude of its current position informed by GPS 40 to the information server 21 without changing the data, the information server 21 maps the area with the longitude and latitude to retrieve information on the situation of the appropriate area. Step S216 which refers to information on the situation of a point on the way to the destination during travelling corresponds to S114 to thereby terminate the series of sequencing operations.

An example in which the aged situation information is discarded and the newest information is automatically loaded on the mobile terminal 20 at constant intervals of time will be described next.

FIG. 10 shows a sequence of operations in which the mobile terminal 20 inquires of the information server 21 periodically necessary situation information and downloads same. The difference between this sequence of operations and that of FIG. 9 will be described mainly in a contrasting manner.

The sequence of steps S300 to S304 in which the mobile terminal 20 reports positional information on its current place and destination to the information server 21 is similar to the sequence of S200 to S204 of FIG. 9. The information server 21 determines from the positional information on the mobile terminal 20 in which area the mobile terminal 20 is present, and stores that area as historical information. The information server 21 then compares the current area in which the mobile terminal 20 is present and the previous area in which the mobile terminal 20 reported its previous positional information to determine whether they coincide with each other (S308). If so, the information server determines that the mobile terminal 20 is still in the same area as before and shifts its operation to interruption of the connection without retrieving information on the situation (S314). This function is provided to eliminate a waste of downloading the same information on the situation when there is no situation in which the moving speed of the mobile terminal is abnormally low compared to its normal moving speed, for example, when a change in the situation is slow compared to the intervals of time for inquiry and the mobile terminal 20 remains stationary. Referring back to sequence S308, the description continues. If the result of the determination indicates non-coincidence, the information server determines that the mobile terminal 20 has moved to the next area, downloads the situation information and performs the sequencing operations up to referring to the situation information (S310–S316), which are similar to the sequencing operations S208–S216 of FIG. 9. The step S318 involves a re-inquiry determining process in which the mobile terminal starts up a timer, waits until a given count is reached, passes to step S304 unless there is a request for termination from the user, and passes to a step S320 involving the termination of the process if there is a request for termination. While at S308 the example of the function provided to eliminate the waste of downloading the same situation information has been illustrated, an example realized by causing the information server 21 to manage the history of the information downloaded on the mobile terminal 20 and to download on the mobile terminal 20 only information, which has not yet been downloaded on the mobile terminal 20, in response to an inquiry from the mobile terminal 20 may be incorporated easily into the above-mentioned sequence of operations.

In the above, it has been described that the mobile terminal 20 accesses the information server 21 at constant intervals of distance when the beforehand loaded information has become old and the newest information is required. Referring to FIG. 11, the embodiment which does not use the mere distance from the starting point will be illustrated which realizes that concept in which when a mobile terminal travels from the starting point to the destination through a series of areas into which positions on the ground are divided as blocks, an area containing the starting point is defined as starting area and, an area to which the mobile terminal moves from the present area is defined as next area among the areas through which the mobile terminal goes to the destination and situation information on the next area adjacent to the present area is automatically loaded one after another.

The difference between FIGS. 11 and 10 will be mainly described next. A sequence of S400–S402 performed until the inquiry program is started up is similar to that of FIG. 10. In FIG. 11, the mobile terminal 20 calculates its current area from information on its present position and checks whether the situation information on the above-mentioned next area has been already downloaded. If so, control passes to a termination determining step S418. If not, that is, if the situation information on the next area has not yet been downloaded, the positional information on the next area is reported (S408). This positional information relates to a range indicated in longitude and latitude. Receiving this information, the information server 21 retrieves the situation information on the specified area from the database and sends it to the mobile terminal 20. The mobile terminal 20 stores the situation information received from the information server 21 (S412). The connection is then cut (S414) so as to allow the user to refer to the situation information on the next area (S416). Control then passes to a termination determining step S418, which is similar to S318 of FIG. 10. Unless there is no request for termination within a certain time, control passes to S404 where it is determined from the information on the current position whether there is any situation information on the next area. Also, at this step, when the mobile terminal stops, the situation information on the next area may get old. However, there is no problem arising when the user stops, for example, at a restaurant if the user terminates the operation of this program and starts up the program when the user restarts. The mobile terminal 20 may set an effective term to the situation information downloaded from the information server 21, periodically inquire of the information server whether the effective term has expired, and if so, downloads the newest situation information even when the user does not move to the next area.

While in the above the next area has been described as being next to the current area, the relationship which will be next described must be satisfied by the "next" area in order that the positional related information to be downloaded on the mobile terminal be significant, as described in the above mentioned BACKGROUND OF THE INVENTION.

Figure 12:
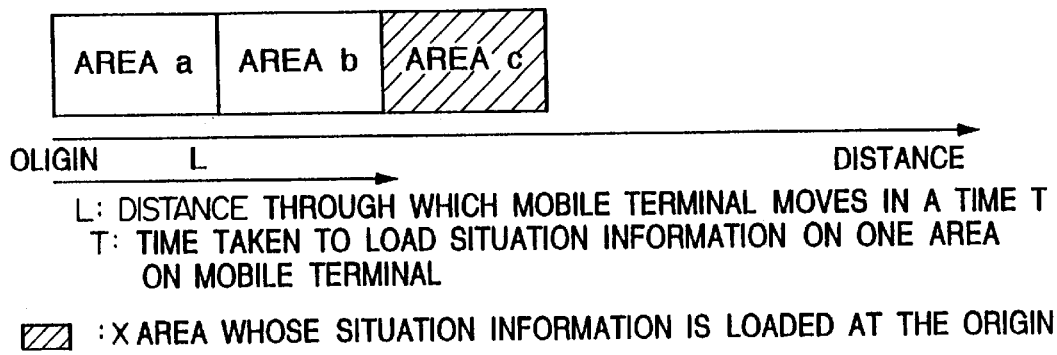
FIG. 12 illustrates a technique for specifying an area whose information is to be loaded in the current area.

FIG. 12 illustrates the relationship between the moving speed of the mobile terminal, data transfer rate and a quantity of data on an area to be downloaded. First, assume that there are divided areas a, b and c with the origin as a reference. In order to simplify the explanation, assume that the areas each take the form of a square having a side length of 1 m, and that a quantity of information data on each of the areas is constant or D (kilobytes). Let the data transfer rate be TR (kilobytes/s) and let the speed of the mobile terminal be V (m/s). In this case, the time T taken for loading information on one area is D/TR (s). The distance L through which the mobile terminal moves during the time T is L=V*D/TR(m). When L is between 1 and 2*1, the area c must be selected as an area next to the origin of FIG. 12. The condition under which the nth area comes are expressed as V*D/(TR*1)–1<n<V*D/(TR*1).

The next area is determined by causing the CPU of the mobile terminal to solve that conditional inequality. When the mobile terminal 20 is set in a car and used, the moving speed of the mobile terminal 20 is obtained from an interface provided to report the current speed of the car from the speed measuring unit to the mobile terminal 20. Alternatively, the moving speed may be calculated from the distance through which the car moved during a constant time, using the GPS. Other parameters may be given as the initial conditions.

In the embodiment, downloading service information on the position or area from the remote information server 21 connected through the public network was illustrated.

The technique which constitute the core of the invention includes easy retrieval of service information by the user as described before. The features of the above example lie in that the time taken for downloading the situation information is hidden from the user. An embodiment will be described which when the service information is stored as compressed data in a disk device built in the mobile terminal 20 and not in remote storage and the time taken for its decompression is much, this time is hidden from the user and information on the appropriate area is retrieved immediately in accordance with the user's request.

Figure 13:
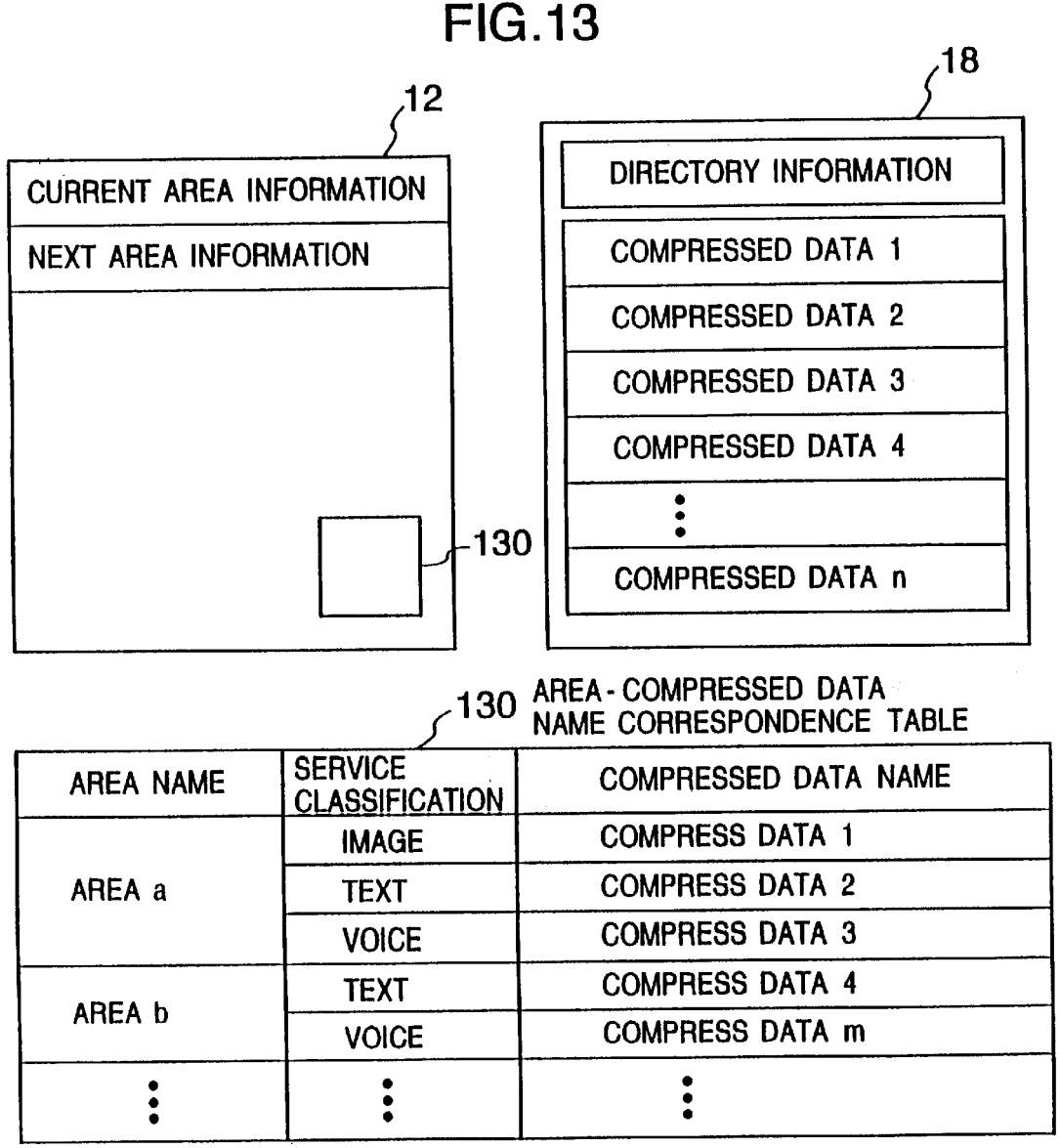
FIG. 13 shows an information structure which will be referred to when compressed data is loaded.

FIG. 13 illustrates service information stored in RAM 12 and memory card 18.

Compressed service information on the respective areas and service classifications are stored in the names of compressed data n (n is a natural number; 1, 2, 3, 4, . . . ) in the memory card 18. Also stored in the memory card is directory information as information on the correspondence between the names of the compressed service information on the respective area and service classifications and their addresses stored in the memory card 18. The compressed data are the ones compressed by various compression algorithms in which the data compression rate is maximum for the respective types of data (text, image, voice).

RAM 12 stores only decompressed service information on the current area (current area information) and decompressed service information on the next area (next area information) and also an area-compressed data name correspondence table 130, which is composed of the next respective fields; that is, an area name field as the name of each area, for example, described in the symbol "a-A" in FIG. 5; a service classification field as a field expressing the classification of each service information; and a compressed data name field paired with its service information field and in which a corresponding compressed data name is written.

Figure 14:
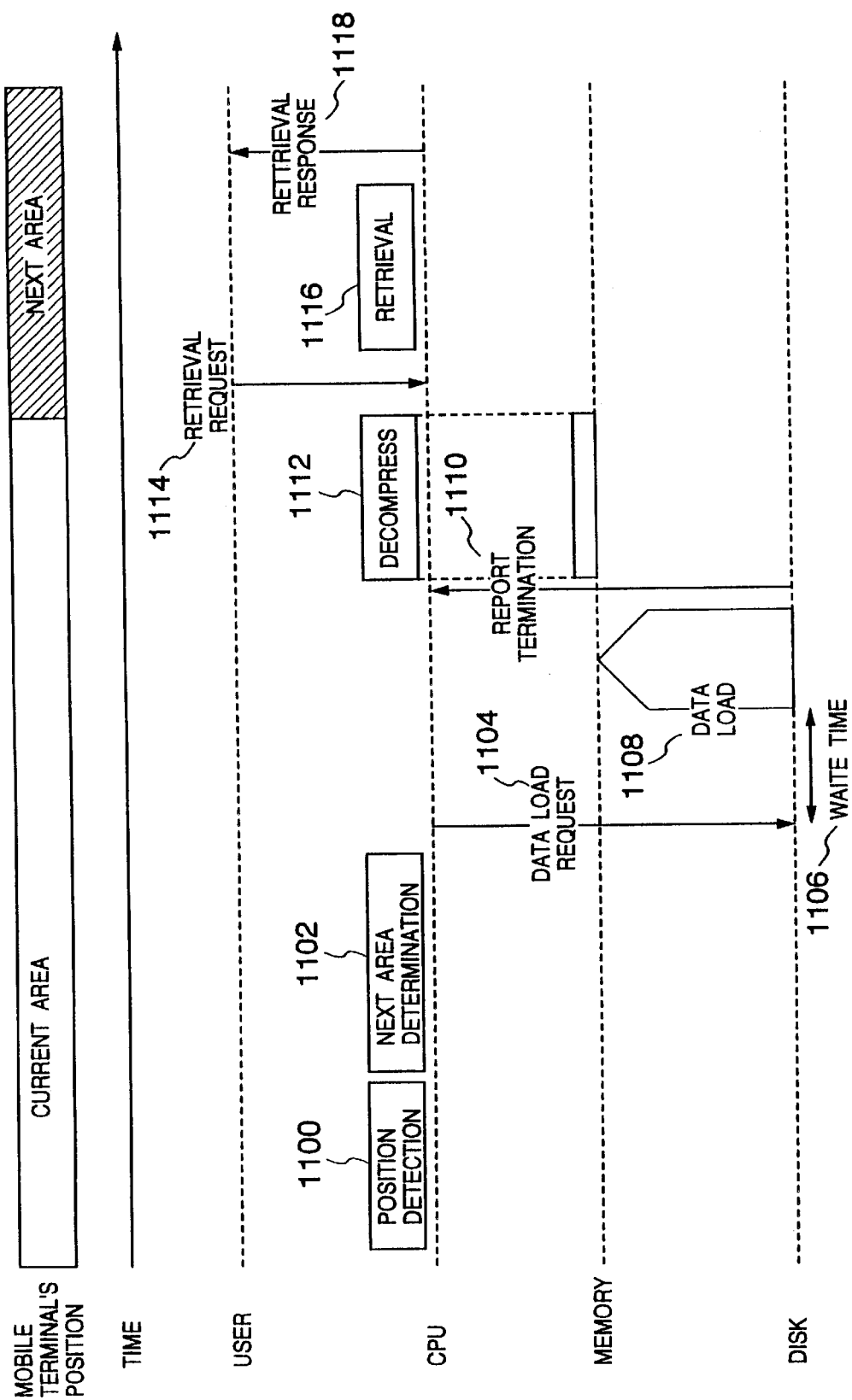
FIG. 14 is a chart illustrating the principles of the present invention used when compressed data is loaded from its disk.

Referring to FIG. 14, the operation chart for CPU 10 and its related elements in the present embodiment will be described next. FIG. 14 is an operation chart which indicates the position of the mobile terminal, and the timing between the user's retrieval of service information, CPU processing, and loading of compressed data between the disk and RAM. FIG. 14 will be described on the analogy to FIG. 11. The respective mobile terminals correspond to the CPU while the information server corresponds to the disk. The determination of the presence/absence of situation information on the next area (S404) corresponds to position detection (1100) and next area determination (1102); reporting of positional information on the next area (S408) corresponds to a data loading request (1104); retrieval of situation information on a specified area and its sending (S410) corresponds to a wait time (1106) and data loading (1108); storage of situation information on the next area (S412) corresponds to reporting the termination of the data loading (1110), and referring to the situation information (S416) corresponds to retrieval request (1114), retrieval (1116), and retrieval response (1118). There is no step corresponding to the decompressing process (1112). Those steps of the present chart will be described sequentially. The chart portions ranging from 1100 to 1112 are periodically repeated by the timer function described at S418.

First, at 1100, it is determined on the basis of positional information from GPS 40 in which area the mobile terminal is. At 1102, it is checked whether service information on the next area (next area information) is stored in RAM 12. If not, table 130 requests a disk such as memory card 19 to load all the compressed data on the next area in their names (1104). The constant wait time (1106) is a relatively long time taken from receipt of a data load request to the stabilization of the rotation of the disk when the disk device has a rotating system and an auto power off function for power saving. The compressed data is disposed in a free area of RAM 12 by data loading at 1108. Receiving a report of termination of data loading (1110) from the disk, CPU 10 decompresses the respective compressed data disposed in the memory area of RAM 12 to restore the next area information when it is in the present area (1112). FIG. 16 shows the format of the present area information and next area information. It is composed of area information which describes a related area and a pair of service classification and service information proper.

When the position detecting function detects the movement of the mobile terminal to the next area, the current area information is released and processing for employing the next area information as the current area information is performed to use the small storage area of RAM 12 effectively.

In this way, the next area information spread on RAM 12 in the previous "present" area is employed as the current area information. The user requests retrieval of service information on the current area (1114). The appropriate service data is retrieved with the service classification of FIG. 16 as a key (1116). The appropriate service data is then given to the user (1118).

While the present embodiment illustrated that the compress data is stored in the disk and that as described with reference to FIG. 9, situation information on a plurality of areas present before the destination is received beforehand in the form of compressed data from the information server 21 and stored in the memory card 19. The use of a method will be easily analogized in which information on a map and/or the positions of shops as the base which do not greatly change is stored in a compressed form in a storage medium such as a CD-ROM while information on rapidly changing road situation and/or commodity prices is downloaded through communication lines from the remote information server and provided as multimedia information such as voice, text and/or images.

When the compressed data is downloaded from the information server to the mobile terminal, data having a higher compression rate will take a longer recompression time. Thus, if the time taken for decomposing the compressed data having a higher compression rate employed to reduce the communication cost is so large that it cannot be neglected compared to the data transmission time, the method of determining the next area as described with reference to FIG. 12 must be changed. To this end, it may be determined from an expression of time T of FIG. 12 plus the time taken for decompressing the compressed data.

As described above, information on the positions of areas is stored in the form of compressed data, for example, in a CD-ROM, and data on the next area is loaded and decompressed in the present area to reduce the time taken to retrieve necessary data in the next area. Thus, a method of determining the next area will be easily understood even though it is not described in detail.

Figure 15:
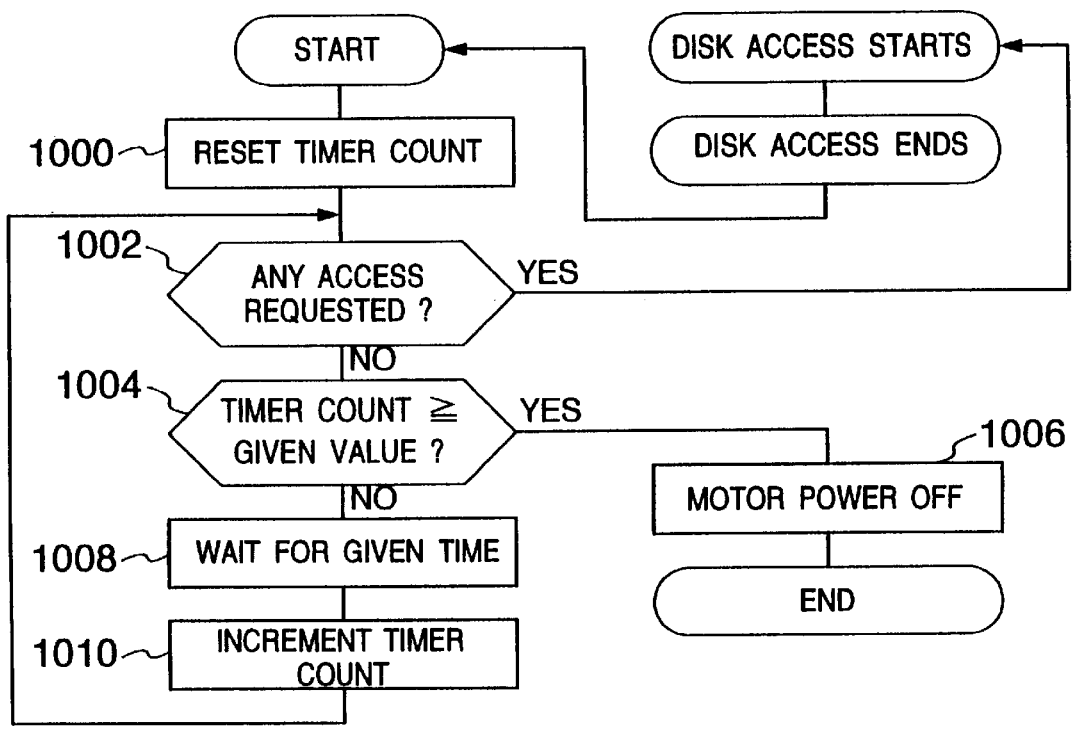
FIG. 15 illustrates an automatic power off logic of storage having a rotating system.

The time T may be approximated by the sum of the wait time and the decomposing time. Especially, a portable CD-ROM drive device must be of a thin light-weight and power saving type, and the maximum torque of its motor can not be so large. Thus, the inertial moment can not be driven sufficiently and the rotation wait time is large. In this respect, the auto power off logic will be described referring to FIG. 15. This logic starts when the disk access ends. First, the timer counter is cleared to 0 (1000) and it is checked whether there is any request for disk access (1002). If so, this process ends and control passes to a disk access process. If there is no request for disk access at 1002, it is checked whether the count of the timer counter has exceeded a predetermined value (1004). If so, the power of the motor is turned off to stop the rotation of the motor (1006). If not, after a given time (1008), the timer count is incremented (1010), and then control passes to a step 1002.

The above relates to the main application of the present invention to the navigation system. Another embodiment will be described next which involves the use of a mobile terminal as a shopping catalogue reference device, that is, of the type in which the consumer carries the mobile terminal into a department store, a shopping town, or an underground shopping center, obtains information on a favorite commodity through the mobile terminal from a commodity database of the information server and uses such information as a reference for buying the commodity.

Radio accessing means in such embodiment is realized, for example, by a PHS (Personal Handyphone System). Thus, a cordless telephone is connected in place of the car telephone 30 of FIG. 8. For the detection of the position of the mobile terminal, a base station for a PHS disposed in the campus determines the position of a nearby mobile terminal on the basis of the radio strength of the cordless telephone. Thus, the mobile terminal system is not required to have a position detector such as GPS 40. An active batch method is well known as such position detecting mechanism. As described above, it is improper to cause the user to input information on the position of a destination in the mobile terminal used as a tool for referring to commodity information near a shop, as described above, as in the previous embodiment because it can not support impulse buying. The present invention is applicable to a system in which information which will be referred to at the destination is loaded in the present area in order to satisfy the immediate referrability of commodity information. The area described above is logical compared to a cell, that is, a range (of an unobstructed viewing distance of about 100 m) which a single base station covers, so that their correspondence is not required to be 1:1. As described above, when no destination is given, all the areas adjacent to the current area are selected as the next areas and information on those areas are downloaded.

FIGS. 17A, 17B each show the relationship between the current area and its next areas. FIG. 17A is a developed view of a plane area, and shows that when bB denotes the current area, aA, aB, aC, bA, bB, bC, cA, cB, and cC denote the next areas. While FIG. 17A is shown in two dimensions, the modification of its concept concerning the two-dimensional arrangement to a three-dimensional area arrangement in which shops are distributed in a plurality of floors will be easily seen. Since the structure of areas is logical, it is unnecessary that the actual cell is a position and that the physical position is a short distance: for example, a case in which an upper and a lower floor are connected by a through elevator or a case in which a building is connected by a connecting passageway to another building.

As described above, the correspondence between a cell and an area is not required to be fixed, but may be changed depending on the quantity of information.

When areas are formed alternately as shown in FIG. 17B, the number of next areas is reduced. Thus, a quantity of information to be downloaded is reduced. If the next area determining method is used, an area which is not next to the current area can be the new next area.

Figure 18:
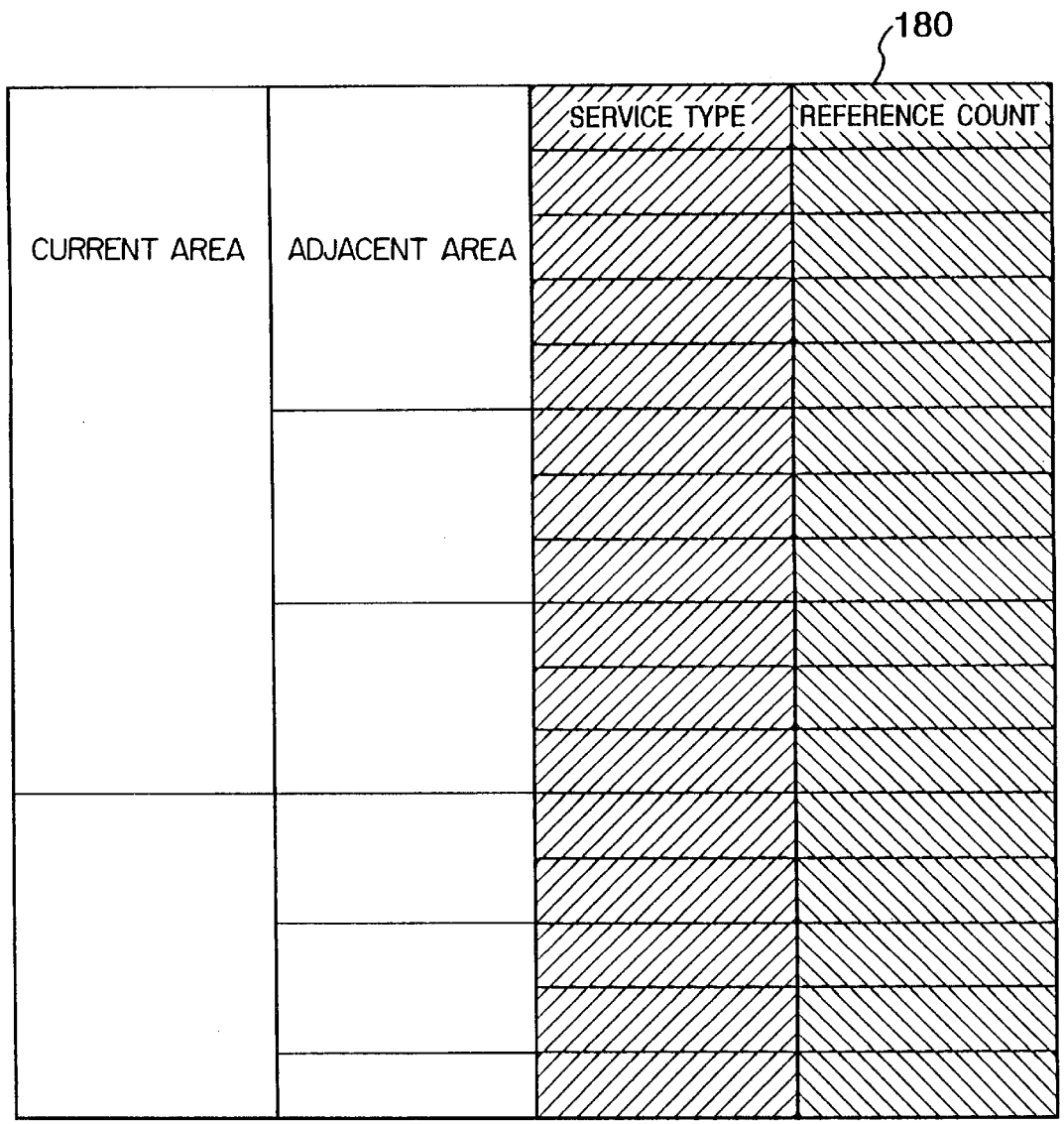
FIG. 18 illustrates a management table of an information server.

When there are many next areas in the above embodiment, some information may overflow from the memory of the mobile terminal 20, which will be described next when an adjacent area is selected as the next area. In this case, a system is employed in which data on the histories of service classifications referred to in the area next to the current area and its next area are downloaded in defending order of the number of histories, which implies providing service preferentially for customers. FIG. 18 shows a management table 180 to realize the present function in the information server 22. In the current area field, the area name is described. In corresponding adjacent area fields, the names of areas adjacent to the current area are described. In a service type field, the type of service information, more specifically, a commodity classification, is described. In a reference count field, the number of times of user's reference to the service information is described. While in FIG. 18 the corresponding fields are expressed in blocks, a hash may be used to speed up the retrieval or they may be placed in a tree-like corresponding relationship. Since those fields involves static information excluding the reference count, specified values and/or information described at the start-up are not frequently updated thereafter.

When the user refers to the appropriate information, the mobile terminal 10 detects this fact and reports same to the information server 21. Receiving this information, the information server 21 increments the reference count. A sequence of operations which will be performed between the mobile terminal and the information server is similar to the sequence of operations of FIG. 10 except that information on the positions of the destination and the current area at S306 of FIG. 10 is not reported.

Figure 19:
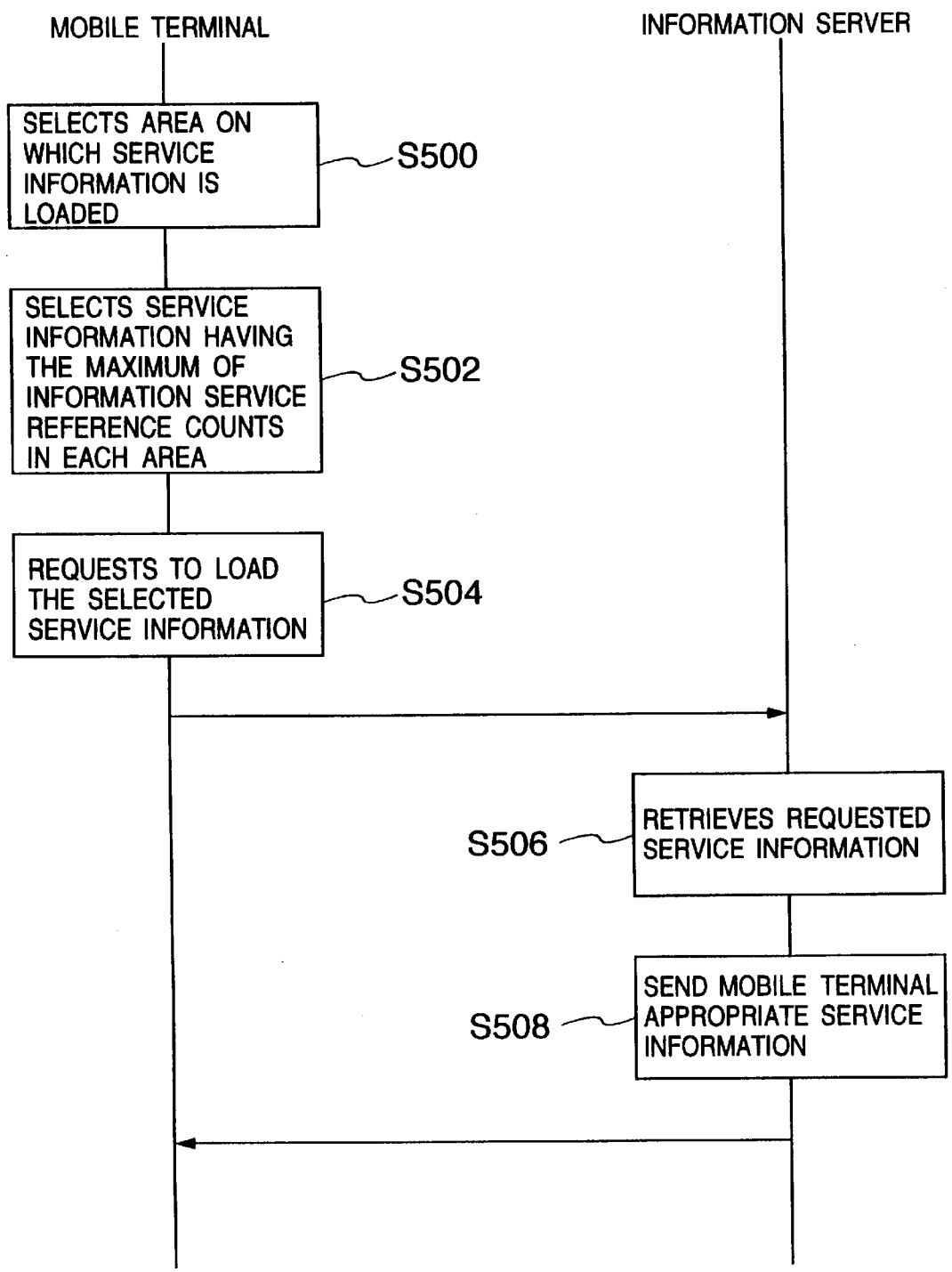
FIG. 19 illustrates a sequence of operations performed between a mobile terminal and information server.

While in the above the information server 21 has been illustrated as performing the management of the position of the mobile terminal 20 and determines service information to be loaded, a sequence of operations which includes performing such function on the side of the mobile terminal 20 will next be described with reference to FIG. 19.

Assume that the mobile terminal 20 is capable of obtaining information on the position of a cell to which the mobile terminal 20 belongs by the PHS services. The mobile terminal 20 has information on the correspondence between the positions of the cells and areas which are the logical units of a range on the service information to thereby specify the current area. As described above, areas adjacent to the current area are obtained from the current area, using table 180 (S500). Service information having a large reference count is selected from the reference counts in the appropriate area on table 180 (S502). The mobile terminal requests from the information server the selected service information in its service type (S504). Receiving this request, the information server retrieves the requested service information from the database (S506) and sends the result of the retrieval to the mobile terminal (S508).

While the service information on all the areas adjacent to the current area is illustrated as loaded in the embodiment, an embodiment will be described in which an area adjacent to the current area on a line of extension which connects the previous and current positions is selected as the next area on the basis of information on the positions of the previous and current areas, and service information on the new adjacent area is loaded on the mobile terminal 20.

Figure 20:
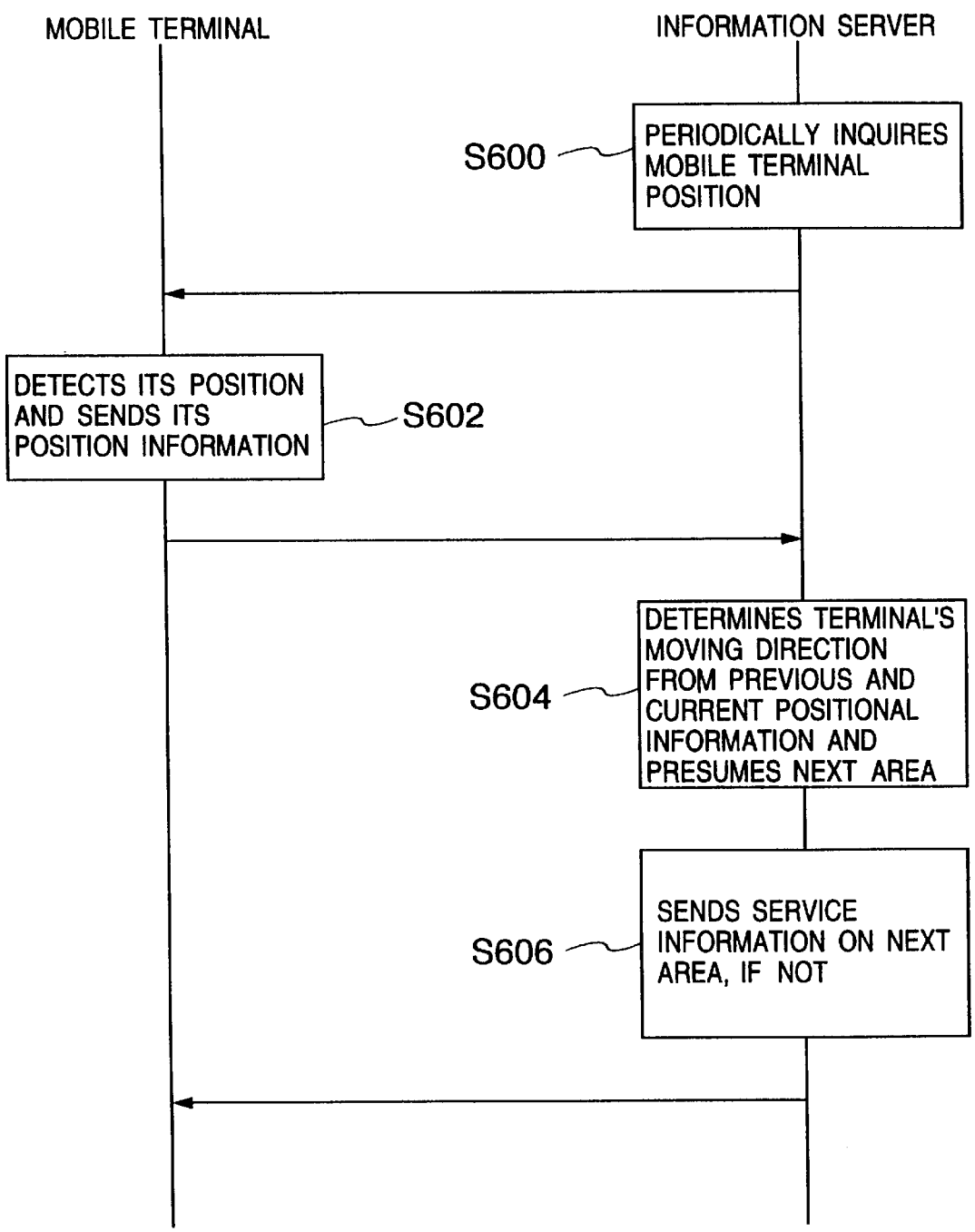
FIG. 20 illustrates a sequence of operations performed between a mobile terminal and information server.
Figure 21:
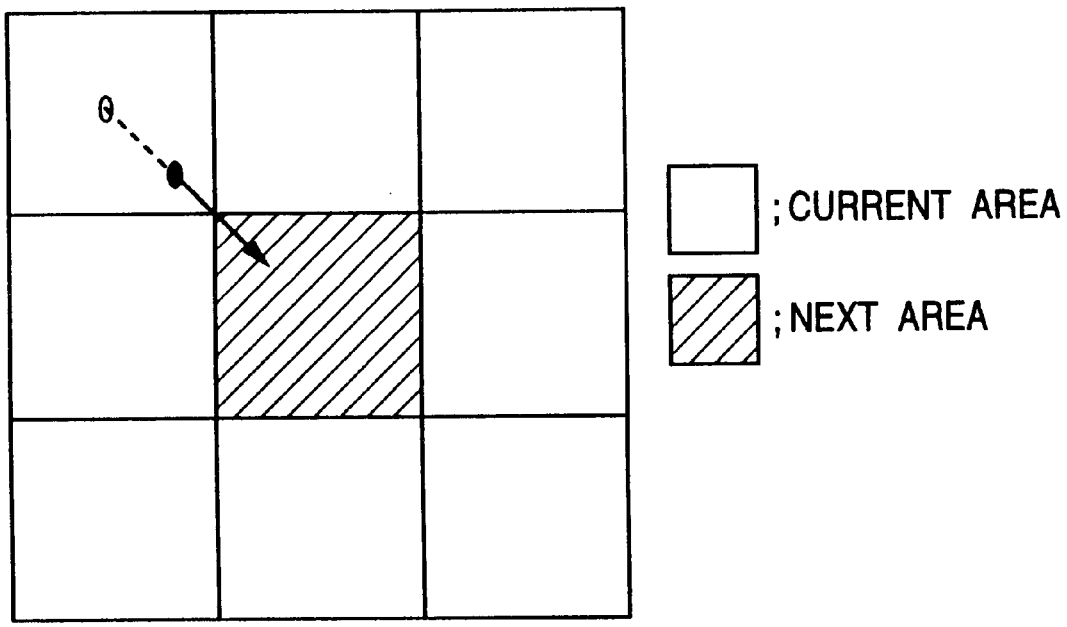
FIG. 21 illustrates the relationship between the moving direction of a mobile terminal and the next area.

FIG. 21 illustrates this concept. A black and a white dot express the previous and current positions, respectively. For example, when those positions are expressed as data in a certain coordinate system, directional data are obtained by subtracting the previous position coordinates from the current position coordinates. A table which indicates the directions of the areas adjacent to the current area is prepared and the adjacent area in the appropriate direction is selected as the next area. FIG. 20 illustrates a sequence of operations performed between the mobile terminal 20 and the information server 21 in the present embodiment. First, the information server 21 periodically inquires of the mobile terminal 20 its position (S600). Receiving this inquiry, the mobile terminal 20 checks whether this message is proper, detects its position, and sends information on its detected position to the information server 21 (S602). Receiving this information, the information server 21 determines the next area, using the above-mentioned method (S604). Unless service information on the determined next area has been sent to the mobile terminal 20, the information server 21 sends it to the mobile terminal (S606).

At S318 of FIG. 10, the timer is started up to give a small wait time. The timer time is a non-changing constant value, so that the communication to the information server 21 is periodical. An embodiment in which the timer time value is changed depending on the moving speed of the mobile terminal will be described next. The relation between the moving speeds of the mobile terminal and the timer time values is stored in the form of a table in the mobile terminal. The mobile terminal periodically recognizes its current area, using the position measuring function of the GPS 40, calculates the moving speed thereof, using time information from its built-in clock, and stores the average of the moving speeds thereof. Immediately before the timer is set, the mobile terminal refers to the average of the moving speeds thereof, searches the table for a corresponding timer time value, sets the timer at this time value, and resets the average of the moving speeds thereof. Thus, when the user remains stationary at a position, the frequency of reporting to the information server 21 and the communication cost are reduced.

While the above description is made on the assumption that the number of access points to the information server 21 is one, the information server may have a plurality of access points. At this time, by storing data on the positions of the respective access points in the mobile terminal, and calculating and comparing the distances between the current position and the respective access points, using GPS 40, the nearest access point is known. The communication fee is reduced by accessing the information server 21 with a dial number at another access point as the mobile terminal moves compared to accessing the information server at the distance between the current position and the access point used at present.

Another embodiment in which a plurality of information servers 21 is provided is conceivable. Also in this case, there is a plurality of access points as in the above case. When there are different service traders having corresponding information servers 21, their contents of service are different and hence it is not appropriate to select them automatically and individually. In such a case, when the mobile terminal 20 detects an information server 21 which reduces the communication cost as the mobile terminal 20 moves, the mobile terminal 20 is required to confirm whether the user assents to change the information server 21 and its contents of the service to the detected information server and its service, and if the user assents, it does so.

The above description illustrates the example in which mobile service information which will be referred to in the from of a response to reporting information on a road along which the mobile terminal 20 travels is sent beforehand from the information server 21 to the mobile terminal 20. One example of a sequence of operations in which when a situation occurs which will influence the route along which the mobile terminal 20 travels, the information server 21 detects this fact and sends appropriate service information to the mobile terminal will be described with reference to FIG. 22.

The information server 21 monitors possible occurrence of situation information at all times (S740). Since a sequence of operations including providing positional information periodically for the information server (S700–S708, S728) is similar to that of the above embodiments, it will be omitted. Receiving the positional information, the information server 21 presumes the route along which the mobile terminal travels, on the basis of the positional information received so far (S710). When the information server 21 is capable of presuming the route and there is no need for inquiring more information from the mobile terminal and there is no service information, the information server 21 cuts the connection without sending any information to the mobile terminal (S712). Thereafter, the information server 21 monitors possible occurrence of situation information. When such information occurs, the information server 21 picks up all the mobile terminals which the situation information will influence from information on the presumption of the route prepared for each mobile terminal. If there are no appropriate ones, the information server 21 waits for a report of positional information from some mobile terminals 20 (S714). If there is any mobile terminal which the situation information would influence, the information server predicts its influence, and prepares for each terminal as service information bypath information about avoidance from such influence. The information server schedules the timing of sending the appropriate service information and establishes the connection to an appropriate terminal when the appropriate time is reached (S718), and sends the appropriate service information with an indication "urgent" to the appropriate mobile terminal (S718). Thereafter, the information server 21 cuts the connection (S720) to prepare for receiving a report of positional information and/or a possible occurrence of further situation information. Receiving the service information so sent, the mobile terminal 20 views the indication "urgent" added to the service information and presents the appropriate service information to the user (S724). Seeing this service information, the user changes the route in accordance with the guide of the service information.

While in the above described sequence, the user inputs data on the destination when the inquiry program has started up, a sequence of operations in which no inputting of information on the destination by the user is required will be described below.

The mobile terminal 20 having the built-in GPS has a positional information history managing function, and a system file which stores positional information. When supply of the power starts (S800), the mobile terminal 20 writes positional information periodically into the system file (S801). The file has an upper limit of an amount of positional information to be stored. When a stored quantity of the positional information reaches the upper limit, the file is used by again from its head by overwriting. At this time, positional information and the time are both stored. When the inquiry program is started up (S802), the mobile terminal reads positional information a given time before from the file and reports it to the information server (S806). Receiving this information, the information server 21 predicts from the information on the route along which the mobile terminal 20 travels, and sends necessary service information, if any, to the mobile terminal (S808). Thereafter, the mobile terminal periodically reports its current place to the information server (S816, S806).

By such composition, timely information on the situation which the user of the mobile terminal needs on the spot can be retrieved immediately. More specifically, assume that this device is applied to a car navigation system. When gasoline is desired to be fed to the car during driving, the position of a nearby gas station, the gasoline maker and price, etc., are displayed on the spot. Thus, appropriate fuelling is achieved at his judgement. That is, by receiving convenient information, the user can do comfortable shopping during driving. Since the user is able to avoid implication into a traffic jam and/or use a shortcut and/or byway, the user is able to reach the destination rapidly, advantageously.

The present embodiment relates to a system composition in which no radio communication device and/or position recognizing device are annexed to the mobile terminal. Thus, by this embodiment, the cost is reduced correspondingly, so that an inexpensive navigation system is provided for the user, advantageously. Since the communication means used for downloading various service information mentioned above is the public telephone network, a large amount of high quality data for multimedia is available in a short time at an inexpensive price. Since the public telephone network is spread nationwide and a communication infrastructure, it is usable anywhere in this country, advantageously.

When the destination of the user who uses the navigation system is not fixed or far away, the user is able to immediately retrieve the newest service information on the spot as requested at whatever speeds the user may move. In order to download the service information, there is no need for taking the trouble to come to a place where a fixed access point to the public line such as for the public telephone is provided. In addition, since downloading is performed automatically, the user is not required to take the trouble to perform the downloading operation, advantageously. Since the already downloaded information is prevented from being again downloaded by downloading the newest service information automatically (periodically), no excess communication fee is required to be paid for downloading useless information, advantageously.

Advantageously, by carrying the mobile terminal even when the user walks or uses a public traffic service without mounting it only on a car, the system which is capable of receiving navigation service is capable of immediately retrieving information on any particular spot without reducing consumption of the battery power. In addition, by downloading only rapidly changing service information from a remote information server and storing service information which does not rapidly change in the built-in storage, the communication cost is reduced, advantageously.

Information related to commodities which the user liked at a glance in a commodity information reference system at a shopping center can be immediately referred to on the spot. Furthermore, by the composition of a logical area, a memory quantity in the mobile terminal is reduced, advantageously.

By filtering information to be downloaded with information in the moving direction of the mobile terminal, the communication cost and the storage capacity are reduced, and hence the overhead in the present process is reduced, advantageously.

In an arrangement to which a remote work support system is applied, the operator is able to obtain information on work in the work area before the operator arrives at the work area, using the present mobile terminal, and is able to start his work as soon as the operator arrives at the work area, so that the working efficiency is improved. By provision of a cable which connects a work area monitoring device and a command center, downloading support information on the mobile terminal is only required and there is no information to be communicated from the mobile terminal to the command center thorough a radio system. Thus, the consumption power of the mobile terminal is reduced.

Since in a refuge guidance system detailed information on a refuge route for a refugee with a mobile terminal to take can be given to the refugee through multimedia information, a person who has no appropriate knowledge, for example, about the structure of a complicated building such as underground shops is able to avoid being gotten into a panic and escape rapidly into a safety area. Thus, possible human damage due to a disaster such as a fire and/or earthquake is minimized, advantageously.

Since in a meeting reservation system guests are called into a meeting room of a company as soon as they arrives at the company and information necessary for the meeting is distributed to the respective guests when the guests gather, the wait time before the meeting is reduced and the meeting is started immediately, advantageously. Since in the present embodiment arrival of the guest is not inquired of the information server, the overhead about the inquiry is eliminated and the power consumption of the battery is minimized, advantageously.

By sending time-limited service information spontaneously to the mobile terminal, a shop owner who is an information provider is able to draw customers to his shop, and the user of the mobile terminal is able to immediately retrieve a shop which provides service and/or commodities which satisfies his taste and/or budget from the service information, advantageously.

Using the attributes of the user's mobile terminal, loading inappropriate information on the mobile terminal is avoided to thereby avoid the user's reference to inappropriate information. Conversely, by loading appropriate information on the appropriate mobile terminal beforehand, its user is able to immediately refer to appropriate information depending on the situation as requested.

When a program to be used or data to be referred to are fixed in an area or when their correlation is high, the executing performance of the mobile terminal with a virtual storage mechanism is improved to thereby provide the user with a comfortable computer environment.

According to the present invention, a communication method which provides necessary information for the user on a real time basis and a mobile terminal preferred for this communication method are provided.

According to the present invention, a communication method which information to be provided for the user is transferred to the user at appropriate timing and a mobile terminal preferred for execution of this communication method are provided.

What is claimed is:

1. A method of providing information from an information server to a mobile terminal in a system which includes the mobile terminal, the information server which is connected to a database, a network connected to the information server, and a terminal connected to the network for providing various information for the information server, said method comprising the steps of:

connecting the mobile terminal to the network and when information on the current location and destination of the mobile terminal is input to the mobile terminal, reporting the input information on the current location and destination to the information server through the network;

causing the information server to determine the area surrounding an expected route including the current location and destination of the mobile terminal when the information server receives from the mobile terminal a report including information on the current location and destination of the mobile terminal, and to send service information including price information of a product provided in an area corresponding to the area surrounding the expected route through the network to the mobile terminal; and causing the mobile terminal to store the received service information including price information of a product provided in the corresponding to the area surrounding the expected route, to cut the connection to the network and to output the previously stored service information in accordance with the user's request.

2. A method of providing information from an information server to a mobile terminal in a system which includes the mobile terminal, the information server which is connected to a database, a network connected to the information server, and a terminal connected to the network for providing various information for the information server, wherein the mobile terminal is connected to a portable telephone set so as to be connected to the network, and connected to a GPS which periodically stores information on its position in a memory, said method comprising the steps of:

the mobile terminal receiving information regarding the present location of the GPS from the GPS and input information on a destination of the mobile terminal;

the mobile terminal informing, through the network, the information server of the received information regarding the current location and the destination of the mobile terminal;

the information server, having received from the mobile terminal, information regarding the current location and destination of the mobile terminal, the information server determining the area surrounding an expected route including the current location and destination, and sending service information including price information of a product provided in an area corresponding to the area surrounding the expected route through the network to the mobile terminal; and the mobile terminal storing the received service information including the price information of a product in the area corresponding to the area surrounding the expected route, cutting the connection to the network, and outputting the previously stored service information in accordance with the user's request.

3. A method according to claim 2, further comprising the steps of:

the mobile terminal periodically sending information regarding the current location thereof through the network to the information server; and the information server periodically sending the service information through the network to the mobile terminal.

4. A method according to claim 3, further comprising the steps of:

when the information server receives the information regarding the current location of the mobile terminal from the mobile terminal, the information server comparing the service information regarding the area surrounding the expected route previously sent to the mobile terminal and further service information regarding an area surrounding the expected route to be sent; and when the further service information regarding the area surrounding the expected route to be sent is different from that of the service information previously sent, the information server sending the further service information regarding the area to be sent through the network to the mobile terminal.

5. A method according to claim 3, wherein the mobile terminal performs the steps of:

producing history information by periodically storing information regarding the position of the mobile terminal;

determining the next area surrounding the expected route from the produced history information;

reporting information regarding the next area surrounding the expected route to the information server through the network; and inquiring of the information server service information regarding the next area surrounding the expected route.

6. A method according to claim 5, further comprising the steps of:

storing the service information regarding the area surrounding the expected route including the current location and destination of the mobile terminal sent from the information server, as compressed data, in an external storage of the mobile terminal;

reading the service information on the next area surrounding the expected route stored in the external storage when the determined service information on the next area surrounding the expected route is not stored in a RAM of the mobile terminal;

decompressing the read service information; and storing the decompressed information in the RAM of the mobile terminal.

7. An information providing system, comprising:

a mobile terminal;

an information server connected to a database;

a network connected to the information server; and a terminal connected to the network for providing various information for the information server, wherein:

the mobile terminal is connected to the network, and when the current location and destination of the mobile terminal is input to the mobile terminal, the mobile terminal reports the input information regarding the current location and destination to the information server through the network;

the information server determines the area surrounding an expected route including the current location and destination of the mobile terminal whose information was received from the mobile terminal, and sends service information including price information of a product provided in an area corresponding to the area surrounding the expected route through the network to the mobile terminal; and the mobile terminal stores the received service information including the positional information corresponding to the area surrounding the expected route, and outputs the stored service information on a real time basis in accordance with the user's request.

8. An information providing system, comprising:

a mobile terminal;

an information server connected to a database;

a network connected to the information server; and a terminal connected to the network for providing various information for the information server; and a GPS connected to the mobile terminal for periodically storing a position thereof in memory; and wherein when the mobile terminal receives information regarding the present location of the GPS from the GPS and information regarding a destination, the mobile terminal informs the information server of the received information regarding the current location and destination of the mobile terminal through the network;

when the information server receives from the mobile terminal information regarding the current location and destination, the information server determines the area surrounding the expected route including the current location and destination of the mobile terminal, and sends service information including price information of a product in an area corresponding to the area surrounding the expected route through the network to the mobile terminal; and the mobile terminal stores the received service information including the positional information corresponding to the area surrounding the expected route, cuts the connection to the network, and outputs the stored service information in accordance with the user's request.

9. An information providing system according to claim 8, wherein the mobile terminal periodically sends information regarding the current location thereof through the network to the information server, and the information server periodically sends the service information through the network to the mobile terminal.

10. An information providing system according to claim 9, wherein when the information server receives the information regarding the current location of the mobile terminal from the mobile terminal, the information server compares the service information regarding the area surrounding the expected route previously sent to the mobile terminal and further service information on an area surrounding the expected route to be sent presently, and when the further service information regarding the area surrounding the expected route to be sent presently is different from the service information sent previously, the information server sends the further service information regarding the area surrounding the expected route to be sent presently through the network to the mobile terminal.

11. An information providing system according to claim 9, wherein the mobile terminal produces history information by periodically storing information regarding the position of the mobile terminal, determines the next area surrounding the expected route from the produced history information, reports information regarding the next area surrounding the expected route to the information server through the networks and inquires of the information server service information regarding the next area surrounding the expected route.

12. An information providing system according to claim 11, wherein:

the service information regarding the area surrounding the expected route including the current location and destination of the mobile terminal sent from the information server is stored, as compressed data, in an external storage of the mobile terminal, the service information regarding the next area surrounding the expected route stored in the external storage is read when the determined service information regarding the next area surrounding the expected route is not stored in a RAM of the mobile terminal, the read service information is decompressed, and the decompressed information is stored in the RAM of the mobile terminal.

13. A mobile terminal, comprising:

an input unit connected to a portable telephone set so as to be connected to a network, said input unit being connected to a GPS which stored information regarding the position thereof periodically in a memory, said input unit receiving the information regarding the current location of the GPS from the GPS and a destination of the mobile terminal;

a sender for sending the received information regarding the current location and destination of the mobile terminal through the portable telephone set to an information server connected to the network;

a receiver for receiving from the information server service information including price information of a product provided in the area surrounding an expected route including the current location and destination of the mobile terminal;

storage for storing the service information including the price information of a product in the area surrounding the expected route received from the receiver; and an output for outputting the service information stored previously in the storage in accordance with the user's request.

14. A mobile terminal according to claim 13, further comprising a timer for periodically inquiring of the information server information regarding the current location of the mobile terminal.

15. A mobile terminal according to claim 14, further comprising control means for producing history information by periodically storing information regarding the position thereof, and for determining the next area surrounding the expected route from the produced history information, and wherein the sender informs the information server of the determined next area surrounding the expected route.

16. A mobile terminal according to claim 15, further comprising:

an external storage for storing, as compressed data, the service information regarding the area surrounding the expected route including the current location and destination of the mobile terminal sent from the information server; and a control unit for reading service information regarding the next area surrounding the expected route stored in the external storage when the determined service information regarding the next area surrounding the expected route is not stored in a RAM of the mobile terminal and for decompressing the read service information, wherein the decompressed information is stored in the RAM.

* * * * *